(12) United States Patent
Callen et al.

(10) Patent No.: US 7,378,761 B2
(45) Date of Patent: May 27, 2008

(54) CONTROL CIRCUIT AND A METHOD FOR ELECTRICALLY CONNECTING A LOAD TO A POWER SOURCE

(75) Inventors: Wayne Callen, Redhead (AU); Richard Leslie Brissenden, Abbernethy (AU); Robert Keith Henry Smith, Eleebana (AU)

(73) Assignee: Protectelec Pty Ltd, Mayfield (AU)

( * ) Notice: Subject to any disclaimer, the term of this patent is extended or adjusted under 35 U.S.C. 154(b) by 19 days.

(21) Appl. No.: 10/517,546

(22) PCT Filed: Aug. 4, 2003

(86) PCT No.: PCT/AU03/00983

§ 371 (c)(1),
(2), (4) Date: Dec. 10, 2004

(87) PCT Pub. No.: WO2004/013943

PCT Pub. Date: Feb. 12, 2004

(65) Prior Publication Data

US 2005/0207075 A1    Sep. 22, 2005

(30) Foreign Application Priority Data

Aug. 2, 2002   (AU) .............................. 2002950581

(51) Int. Cl.
*H02H 3/08*   (2006.01)
*H02H 9/00*   (2006.01)
*H01H 47/00*  (2006.01)

(52) U.S. Cl. ..................................... 307/130
(58) Field of Classification Search ................. 307/130
See application file for complete search history.

(56) References Cited

U.S. PATENT DOCUMENTS

| 3,558,979 | A |   | 1/1971 | Lorenz |
| 3,558,980 | A |   | 1/1971 | Florance |
| 3,571,660 | A |   | 3/1971 | Phillips |
| 3,573,550 | A |   | 4/1971 | Baker, Jr. |
| 3,577,035 | A |   | 5/1971 | Constable |
| 3,579,041 | A | * | 5/1971 | Paine et al. ................... 361/79 |

(Continued)

FOREIGN PATENT DOCUMENTS

CN            1058303           1/1992

(Continued)

*Primary Examiner*—Michael Sherry
*Assistant Examiner*—Adi Amrany
(74) *Attorney, Agent, or Firm*—McNees Wallace & Nurick, LLC

(57) ABSTRACT

A control circuit (1) includes two input terminals (2, 3) for respectively electrically connecting with the active and neutral conductors (4, 5) of a mains power source (6). Two output terminals (7, 8) electrically connect with a load in the form of a two pin domestic electrical appliance (9). Conductors (4, 5) terminate at a domestic power outlet socket, and terminals (7, 8) are incorporated into a two pin plug for insertion into that socket. That is, terminals (7, 8) include elongate bundled conductors for extending between the outlet socket and the circuit. Appliance (9) has a conductive component, in this instance a housing (10) that, under normal operating conditions, is electrically insulated or otherwise electrically isolated from conductors (4, 5). The housing provides a reference point for circuit (1), and is electrically connected to that circuit by way of a conductor (11).

11 Claims, 11 Drawing Sheets

U.S. PATENT DOCUMENTS

| | | | |
|---|---|---|---|
| 3,597,654 A | 8/1971 | Harland, Jr. et al. | |
| 3,600,634 A | 8/1971 | Muench, Jr. | |
| 3,611,050 A | 10/1971 | Weber | |
| 3,626,249 A | 12/1971 | Snedeker | |
| 3,668,471 A | 6/1972 | Ambler et al. | |
| 3,689,800 A | 9/1972 | Lau et al. | |
| 3,723,815 A | 3/1973 | Ambler et al. | |
| 3,760,228 A | 9/1973 | Uchida | |
| 3,780,348 A | 12/1973 | Loukidis | |
| 3,781,608 A | 12/1973 | Geiger | |
| 3,786,311 A | 1/1974 | Hobson, Jr. et al. | |
| 3,814,987 A | 6/1974 | Chacon | |
| 3,840,784 A | 10/1974 | Schauffele | |
| RE28,490 E | 7/1975 | Chen et al. | |
| 3,899,717 A | 8/1975 | Legatti et al. | |
| 3,916,309 A | 10/1975 | Foulkes et al. | |
| 3,919,601 A | 11/1975 | Suko et al. | |
| 3,931,546 A | 1/1976 | Jakobs et al. | |
| 3,988,642 A | 10/1976 | Herchner | |
| 4,002,950 A | 1/1977 | Dickerson | |
| 4,028,737 A | 6/1977 | Bailey | |
| 4,038,626 A | 7/1977 | Haydu et al. | |
| 4,044,395 A | 8/1977 | Eckart | |
| 4,068,283 A | 1/1978 | Russell | |
| 4,072,998 A | 2/1978 | Schei | |
| 4,213,164 A | 7/1980 | Gaertner | |
| 4,242,713 A | 12/1980 | Lewis, Jr. et al. | |
| 4,329,669 A | 5/1982 | Krasser et al. | |
| 4,352,058 A | 9/1982 | Westra | |
| 4,368,499 A | 1/1983 | Stifter | |
| 4,377,832 A | 3/1983 | Toney et al. | |
| 4,426,670 A | 1/1984 | Ilar et al. | |
| 4,441,134 A | 4/1984 | Lewiner et al. | |
| 4,495,536 A | 1/1985 | Bynum | |
| 4,495,538 A | 1/1985 | Thomas | |
| 4,551,697 A | 11/1985 | Kussy | |
| 4,597,025 A | 6/1986 | Rutchik et al. | |
| 4,672,501 A | 6/1987 | Bilac et al. | |
| 4,677,519 A | 6/1987 | Rodriguez et al. | |
| 4,686,383 A | 8/1987 | Croft | |
| 4,692,834 A | 9/1987 | Iwahashi et al. | |
| 4,712,153 A | 12/1987 | Marget et al. | |
| 4,771,357 A | 9/1988 | Lorincz et al. | |
| 4,774,620 A | 9/1988 | Enomoto et al. | |
| 4,791,517 A | 12/1988 | Park | |
| 4,829,457 A | 5/1989 | Russo et al. | |
| 4,862,309 A | 8/1989 | Tojo et al. | |
| 4,870,530 A | 9/1989 | Hurst et al. | |
| 4,890,185 A | 12/1989 | Karl et al. | |
| 4,926,281 A | 5/1990 | Murphy | |
| 4,935,836 A | 6/1990 | Labbus et al. | |
| 5,105,328 A | 4/1992 | Schoofs | |
| 5,113,304 A | 5/1992 | Ozaki et al. | |
| 5,124,874 A | 6/1992 | Sakai | |
| 5,124,875 A | 6/1992 | Ishii et al. | |
| 5,150,270 A | 9/1992 | Ernst et al. | |
| 5,164,693 A | 11/1992 | Yokoyama et al. | |
| 5,166,852 A | 11/1992 | Sano | |
| 5,179,494 A | 1/1993 | Matsubara | |
| 5,193,042 A | 3/1993 | Espinoza et al. | |
| 5,202,811 A | 4/1993 | Minks | |
| 5,231,309 A | 7/1993 | Soma et al. | |
| 5,270,576 A * | 12/1993 | Kahle | 307/131 |
| 5,276,416 A | 1/1994 | Ozaki | |
| 5,319,515 A | 6/1994 | Pryor et al. | |
| 5,325,258 A | 6/1994 | Choi et al. | |
| 5,351,214 A | 9/1994 | Rouy | |
| 5,381,121 A | 1/1995 | Peter et al. | |
| 5,390,066 A | 2/1995 | Parrier et al. | |
| 5,430,595 A | 7/1995 | Wagner et al. | |
| 5,448,443 A * | 9/1995 | Muelleman | 361/111 |
| 5,467,242 A | 11/1995 | Kiraly | |
| 5,467,921 A | 11/1995 | Shreeve et al. | |
| 5,471,144 A | 11/1995 | Meyer | |
| 5,489,840 A | 2/1996 | Caron | |
| 5,539,694 A | 7/1996 | Rouy | |
| 5,559,657 A | 9/1996 | Lam | |
| 5,581,218 A | 12/1996 | Bagalini et al. | |
| 5,587,864 A | 12/1996 | Gale et al. | |
| 5,592,353 A | 1/1997 | Shinohara et al. | |
| 5,600,524 A * | 2/1997 | Neiger et al. | 361/42 |
| 5,602,044 A | 2/1997 | Rouy | |
| 5,606,480 A | 2/1997 | Nevo | |
| 5,621,601 A | 4/1997 | Fujihira et al. | |
| 5,625,519 A | 4/1997 | Atkins | |
| 5,636,097 A | 6/1997 | Palara et al. | |
| 5,666,254 A | 9/1997 | Thomas et al. | |
| 5,689,395 A | 11/1997 | Duffy et al. | |
| 5,818,675 A | 10/1998 | Lu | |
| 5,856,902 A | 1/1999 | Hashimoto et al. | |
| 5,956,218 A | 9/1999 | Berthold | |
| 5,973,500 A | 10/1999 | Moreau et al. | |
| 6,002,565 A | 12/1999 | Ronisch | |
| 6,023,400 A | 2/2000 | Nevo | |
| 6,278,596 B1 | 8/2001 | Simpson | |
| 6,320,389 B1 | 11/2001 | Tamesue et al. | |
| 6,349,022 B1 | 2/2002 | Myong et al. | |
| 6,433,978 B1 * | 8/2002 | Neiger et al. | 361/42 |
| 6,556,396 B1 | 4/2003 | Takehara et al. | |
| 6,587,324 B2 | 7/2003 | Lee et al. | |
| 6,594,127 B2 | 7/2003 | Takehara et al. | |
| 6,628,486 B1 | 9/2003 | Macbeth | |
| 6,650,516 B2 | 11/2003 | Langford et al. | |
| 6,671,144 B1 | 12/2003 | Langford et al. | |
| 6,720,678 B2 | 4/2004 | Green et al. | |
| 6,747,856 B1 | 6/2004 | Huber et al. | |
| 2001/0022713 A1 | 9/2001 | Gimenez et al. | |
| 2002/0180444 A1 | 12/2002 | Bauer | |
| 2003/0007299 A1 | 1/2003 | Schweitzer, III et al. | |
| 2003/0011950 A1 | 1/2003 | Steffen | |
| 2003/0076638 A1 | 4/2003 | Simonelli et al. | |
| 2003/0117246 A1 | 6/2003 | Baiatu et al. | |
| 2003/0133239 A1 | 7/2003 | Feil | |
| 2003/0160618 A1 | 8/2003 | Titschert et al. | |
| 2003/0218843 A1 | 11/2003 | Tsukasaki et al. | |
| 2003/0223163 A1 | 12/2003 | Robbins | |
| 2004/0027753 A1 | 2/2004 | Friedrichs et al. | |
| 2004/0042139 A1 | 3/2004 | Belverde et al. | |
| 2004/0075963 A1 | 4/2004 | Liu et al. | |
| 2004/0183828 A1 | 9/2004 | Nichogi et al. | |

FOREIGN PATENT DOCUMENTS

| | | |
|---|---|---|
| CN | 1350352 A | 5/2002 |
| CN | 1 384 575 | 12/2002 |
| CN | 1 384 576 | 12/2002 |
| CN | 1 384 577 | 12/2002 |
| CN | 1 384 578 | 12/2002 |
| DE | 101 20 189 A1 | 11/2002 |
| EP | 0 007 208 A1 | 1/1980 |
| EP | 0 046 024 | 2/1982 |
| EP | 0 113 026 | 7/1984 |
| EP | 0 739 073 | 10/1986 |
| EP | 0 205 369 A1 | 12/1986 |
| EP | 0 252 786 A1 | 1/1988 |
| EP | 0 339 598 A2 | 11/1989 |
| EP | 0 350 824 A2 | 1/1990 |
| EP | 0 350 829 A2 | 1/1990 |
| EP | 0 373 712 A3 | 6/1990 |
| EP | 0 374 417 A2 | 6/1990 |
| EP | 0 524 300 A1 | 1/1993 |
| EP | 0 531 601 A1 | 3/1993 |
| EP | 0 541 140 A2 | 5/1993 |
| EP | 0 563 774 B1 | 10/1993 |

| | | | | | | |
|---|---|---|---|---|---|---|
| EP | 0 614 259 B1 | 9/1994 | | JP | 5252643 A2 | 9/1993 |
| EP | 0 651 488 A1 | 5/1995 | | JP | 5328596 A2 | 12/1993 |
| EP | 0 851 450 A2 | 7/1998 | | JP | 5336652 A2 | 12/1993 |
| EP | 0 890 846 A2 | 1/1999 | | JP | 5342977 A2 | 12/1993 |
| EP | 0 952 653 A2 | 10/1999 | | JP | 06225440 A2 | 8/1994 |
| EP | 0 991 159 | 4/2000 | | JP | 06331498 A2 | 12/1994 |
| EP | 1 061 374 A2 | 12/2000 | | JP | 07007838 A2 | 1/1995 |
| EP | 1 241 698 A2 | 9/2002 | | JP | 07222460 A2 | 8/1995 |
| EP | 1 420 431 A1 | 5/2004 | | JP | 7298478 A2 | 11/1995 |
| FR | 2538179 | 6/1984 | | JP | 8009632 A2 | 1/1996 |
| FR | 2640441 A | 6/1990 | | JP | 8163704 | 6/1996 |
| GB | 735908 A | 8/1955 | | JP | 08194550 A2 | 7/1996 |
| GB | 830018 | 3/1960 | | JP | 08251915 A2 | 9/1996 |
| GB | 1 369 817 | 10/1974 | | JP | 9054123 A2 | 2/1997 |
| GB | 1 424 228 | 2/1976 | | JP | 2000270464 A2 | 9/2000 |
| GB | 2 170 367 | 7/1986 | | JP | 2000346427 A2 | 12/2000 |
| GB | 2 198 299 | 6/1988 | | JP | 2001258148 A2 | 9/2001 |
| GB | 2 286 936 | 8/1995 | | JP | 2002027661 | 1/2002 |
| GB | 2 303 980 | 3/1997 | | JP | 2002-133996 | 5/2002 |
| JP | 2194725 A2 | 8/1980 | | JP | 2002184294 | 6/2002 |
| JP | 58066070 A2 | 4/1983 | | JP | 2003045312 | 2/2003 |
| JP | 58080562 A2 | 5/1983 | | JP | 2003051239 A2 | 2/2003 |
| JP | 61221670 A2 | 10/1986 | | JP | 2003059388 A2 | 2/2003 |
| JP | 63103745 A2 | 5/1988 | | JP | 2003232826 | 8/2003 |
| JP | 63268432 A2 | 11/1988 | | KR | 9505938 | 6/1995 |
| JP | 01064523 A2 | 3/1989 | | KR | 2001/027869 | 4/2001 |
| JP | 01085527 A2 | 3/1989 | | KR | 2002/010733 A | 2/2002 |
| JP | 01126127 A2 | 5/1989 | | KR | 2041973 A | 6/2002 |
| JP | 2060410 A2 | 2/1990 | | RU | 2063049 C1 | 6/1996 |
| JP | 2114183 A2 | 4/1990 | | SU | 1046717 A1 | 10/1983 |
| JP | 02155424 A2 | 6/1990 | | SU | 1798740 A1 | 2/1993 |
| JP | 2216472 A2 | 8/1990 | | WO | WO 86/02786 | 5/1986 |
| JP | 2220323 A2 | 9/1990 | | WO | WO 90/10968 A1 | 9/1990 |
| JP | 3018220 A2 | 1/1991 | | WO | WO 90/11532 A1 | 10/1990 |
| JP | 3070420 A2 | 3/1991 | | WO | WO 91/16637 | 10/1991 |
| JP | 3070421 A2 | 3/1991 | | WO | WO 92/14291 | 8/1992 |
| JP | 3203517 A2 | 9/1991 | | WO | WO 95/10855 | 4/1995 |
| JP | 03256516 A2 | 11/1991 | | WO | WO 96/26567 | 8/1996 |
| JP | 4079717 A2 | 3/1992 | | WO | WO 96/27138 | 9/1996 |
| JP | 04132967 A2 | 5/1992 | | WO | WO 98/24161 A1 | 6/1998 |
| JP | 04183220 A2 | 6/1992 | | WO | WO 01/45128 A1 | 6/2001 |
| JP | 4197017 A2 | 7/1992 | | WO | WO 01/50566 A1 | 7/2001 |
| JP | 4322468 A2 | 11/1992 | | WO | WO 02/01691 A1 | 1/2002 |
| JP | 4331412 A2 | 11/1992 | | WO | WO 02/052598 | 7/2002 |
| JP | 05019877 A2 | 1/1993 | | WO | WO 03/065535 A1 | 8/2003 |
| JP | 05137233 A2 | 6/1993 | | | | |
| JP | 5168144 A2 | 7/1993 | | * cited by examiner | | |

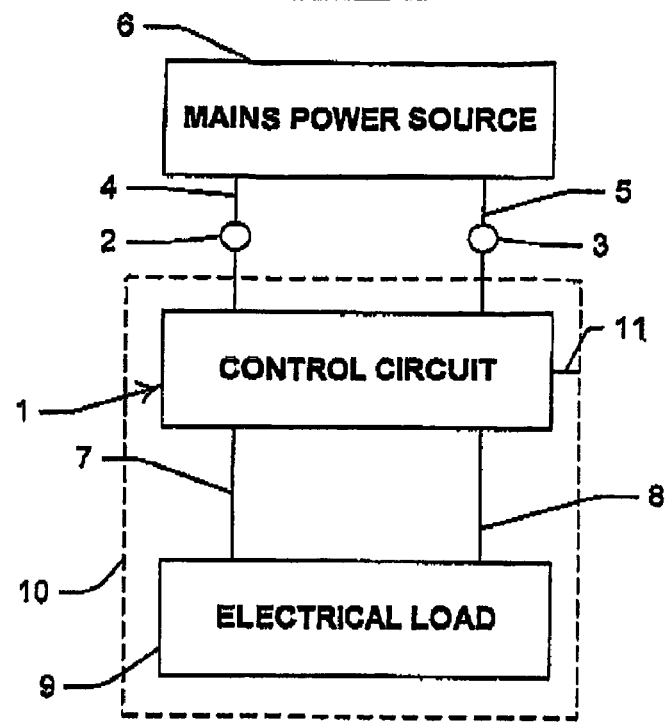
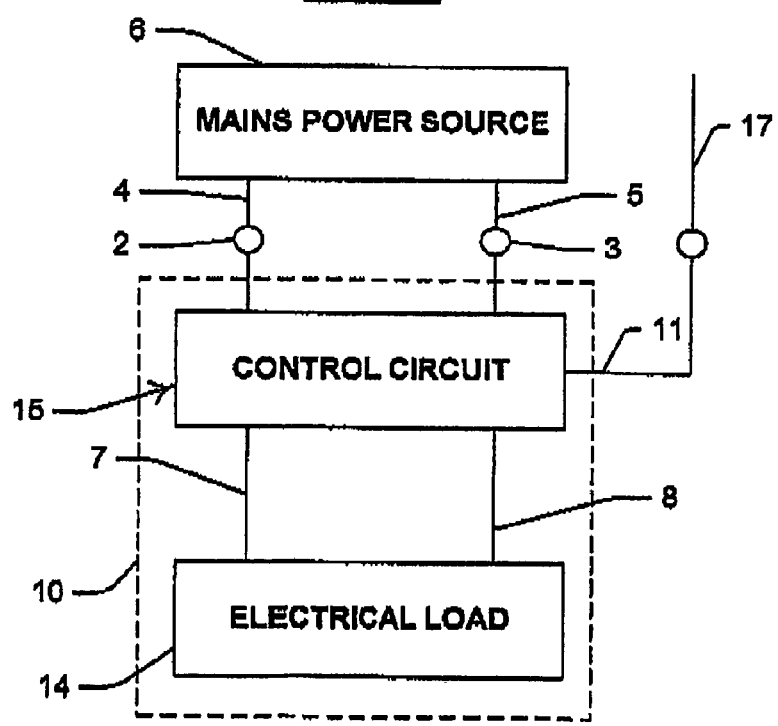

CONTROL CIRCUIT AND A METHOD FOR ELECTRICALLY CONNECTING A LOAD TO A POWER SOURCE

This application claims priority from PCT/AU03/00983 filed Aug. 4, 2003, which claims priority from Australian provisional patent application No. 2002950581, the disclosure of which is incorporated herein by way of cross reference.

FIELD OF THE INVENTION

The present invention relates to a control circuit and a method for electrically a connecting a load to a power source.

The invention has been developed primarily for domestic mains wired installations and will be described hereinafter with reference to that application. However, the invention is not limited to that particular field of use and is suitable for all electrical circuits including industrial and commercial installations, DC supply systems, automotive, marine and other voltage supply applications, and for use in hazardous environments such as mines, petroleum processing plants, petrol stations and the like.

BACKGROUND

Any discussion of the prior art throughout the specification should in no way be considered as an admission that such prior art is widely known or forms part of common general knowledge in the field.

The distribution of electrical power across an electricity grip from a generation site to a consumption site typically occurs by way of a high voltage AC signal that is conveyed by a plurality of coextensive conductors that are suspended on distribution structures such as poles, towers and the like. It is also known to use a neutral conductor that coextends with the other conductors for providing a common reference across the grid. Each, or most of, the structures provide an earth link for the neutral conductor by way of an earth stake that is electrically connected to the neutral conductor. This is referred to as a multiple carting neutral system (MEN) and it provides a convenient means for providing fault protection for the grid and protection of the assets within that grid, as well as protection for those persons who come into contact with those structures.

At a location close to the consumption site, the voltages are transformed to a lower AC voltage that is typically delivered to the site over two wires for a single phase system—an active and a neutral—or four wires for a three phase system—three actives and a neutral. At the consumption site use is made of a separate earth which is often referenced from an earth stake at that site. The neutral conductor is also tied to that earth.

A variety of protection devices have been developed for detecting and protecting against a fault condition associated with a mains wiring systems for commercial and domestic sites such as the consumption site referred to above. These devices generally detect an over-current condition, in that the current in the active conductor exceeds a predetermined threshold, or increases at a rate that suggests there is a low resistance current path between the active conductor and one or both of the neutral or earth conductors.

Notwithstanding these protection devices, there are still many electrocutions and electric shocks that occur due to electrical faults, whether those faults arise from the wiring used at the consumption site, the electrical appliance, the conditions of use of the appliance, or a combination of those factor. As it turns out, the most common form of electrocution is due to a person creating a conductive path between the active conductor and the earth.

SUMMARY OF THE INVENTION

It is an object of the present invention to overcome or ameliorate at least one of the disadvantages of the prior art, or to provide a useful alternative.

According to a first aspect of the invention there is provided a control circuit including:

at least two input terminals for electrically connecting with respective conductors of a mains power source;

at least two output terminals for electrically connecting with a mains load;

a sensor that is responsive to a reference signal being in the range of about 1 Volt to 50 Volts for providing a sensor signal, the reference signal being derived from a voltage differential between one or more of the conductors and a reference point that should, in use, be electrically isolated from the conductors; and a switching device that is responsive to the sensor signal for progressing between a first mode and a second mode wherein: in the first mode the input and output terminals are respectively electrically connected for allowing the load to receive power from the source via the switching device; and in the second mode the input and output terminals are electrically disconnected for preventing the source from supplying power to the load via the switching device.

In an embodiment, the load is an electrical appliance such as: a pump; an electric drill; an electric motor; an iron; a hair dryer; a consumer white-good such as a refrigerator, a washing machine, a clothes dryer; a computer, be that a laptop computer or a desktop computer; a computer peripheral device or stand alone device such as a printer, modem, facsimile machine or the like; a piece of or combination of domestic hi-fi equipment; a television or associated hardware; a hot water kettle; or the like. That is, the load is any device that draws electrical power and which, under normal operating conditions, is rated for use with the level of current protection for which the power source is designed.

In an embodiment, the control circuit is a protective device for electrically isolating the load from the power source once a fault condition has been detected.

According to a second aspect of the invention there is provided a control circuit including:

at least two input terminals for electrically connecting with a power source;

at least two output terminals for electrically connecting with a load;

a sensor that is responsive to a reference signal being within a predetermined range for providing a sensor signal; and a switching device that is responsive to the sensor signal for progressing from a first mode to a second mode wherein: in the first mode the input and output terminals are respectively electrically connected for allowing the load to receive power from the source via the switching device; and in the second mode the input and output terminals are electrically disconnected for preventing the source from supplying power to the load via the switching device.

In an embodiment, if the reference signal moves outside that predetermined range, the switching device remains within the second mode. In other embodiments, however, the switching device automatically returns to the first mode upon the reference signal moving outside the predetermined range. In still further embodiments, the sensor, when not providing the sensor signal, provides no signal. However, in other embodiments, the sensor provides other signals in addition to the sensor signal.

In an embodiment the reference signal is a voltage, and the predetermined range is greater than about 1 Volt. In other embodiments, the predetermined range is greater than about 2 Volts, while in further embodiments, the predetermined range is greater hand about 3 Volts.

In an embodiment, the reference signal is an instantaneous voltage. However, in other embodiments, the reference signal is an average voltage over a predetermined time. In another embodiment, the reference signal is a DC voltage.

In an embodiment, the power source provides a nominal source voltage, and the predetermined range has a lower limit that is less than the nominal source voltage. In an embodiment, the lower limit is less than 50% of the nominal source voltage. In other embodiments, the lower limit is less than 10% of the nominal source voltage. In still further embodiments the lower limit is less than 5% of the nominal source voltage. For example, in one of the embodiments, the nominal source voltage is 110 Volts AC, and the lower limit is about 3.5 Volts AC. That is, the lower limit is only about 3.2% (3.5/110) of the nominal source voltage. In other of the embodiments, the nominal source voltage is 240 Volts AC, and the lower limit is about 3.5 Volts AC. That is, the lower limit is only about 1.5% (3.5/240) of the nominal source voltage.

In an embodiment, the power source is a mains power source, and the load is a mains load. In other embodiments, however, the load is a DC or other load and the control circuit includes a voltage conditioning circuit for converting the mains voltage to the required DC or other voltage required by the load.

In an embodiment, the sensor includes a low voltage relay that toggles between a first state and a second state in response to the reference voltage moving into the predetermined range. In this embodiment, the relay, in the second state, results in the provision of the sensor signal. Preferably, the relay includes a low voltage DC coil, and the reference signal, or a signal derived from the reference signal, is applied across that coil. In one of the preferred embodiments, the reference signal is a voltage that is relative to a neutral conductor of a mains power supply. In other embodiments the reference signal is a voltage that is relative to another conductor such as a negative supply rail of a DC source.

In an embodiment, the switching device includes a mains relay that is responsive to the sensor signal for toggling between two states that respectively give rise to the first mode and the second mode. Preferably, the mains relay includes a coil that is energized by the sensor signal. Even more preferably, in the second mode, the coil is energized by the source. That is, when progressed to the second mode, the protection circuit—in absence of being reset—maintains the input terminals in electrical isolation from the output terminals for such time as the mains source is active.

In an embodiment, the control circuit is a protective device for electrically isolating the load from the power source once a fault condition has been detected.

According to a third aspect of the invention there is provided a control circuit including:

at least two input terminals for electrically connecting with a power source;

at least two output terminals for electrically connecting with a load;

a sensor that is responsive to a reference signal being within a predetermined range for providing a sensor signal; and a switching device that is responsive to the sensor signal for progressing from a first mode to a second mode wherein: in the first mode the input and output terminals are respectively electrically disconnected for allowing the load to receive power from the source via the switching device; and in the second mode the input and output terminals are electrically disconnected for preventing the source from supplying power to the load via the switching device.

In an embodiment, the control circuit is a protective device for electrically connecting the load to the power source once a fault condition has been detected.

According to a fourth aspect of the invention there is provided a control circuit including:

at least two input terminals for electrically connecting with a power source;

at least two output terminals for electrically connecting with a load;

a sensor that is responsive to a reference signal being within a predetermined range for providing a sensor signal; and a switching device that is responsive to the sensor signal for progressing between a first mode and a second mode wherein: in the first mode the input and output terminals are respectively electrically connected for allowing the load to receive power from the source via the switching device; and in the second mode the input and output terminals are electrically disconnected for preventing the source from supplying power to the load via the switching device.

In an embodiment, the circuit includes a reset device for progressing the switching device from the second to the first mode. Preferably, the reset device is manually actuated. However, in other embodiments, the reset device is automated. For example, in an embodiment, the reset device is responsive to the absence of the sensor signal for progressing the switching device from the second to the first mode.

In an embodiment, the sensor moves from an inactive state to an active state in response to the reference signal being within the predetermined range. Preferably, the switching device moves between an inactive state and an active state in response to the sensor signal. More preferably, the switching device, in the active state, is electrically connected to the power source.

In an embodiment, the switching device is a relay having a coil that, in the active state, is energized by the power source.

In an embodiment, the control circuit is a protective device for electrically isolating the load from the power source once a fault condition has been detected. However, in other embodiments, the control circuit is an actuator for electrically connecting the load with the source upon the detection of a fault condition or other predetermined condition.

According to a fifth aspect of the invention there is provided a method for electrically connecting a mains load to a mains power source, the method including:

providing at least two input terminals for electrically connecting with respective conductors of the mains power source;

providing at least two output terminals for electrically connecting with the mains load;

being responsive to a reference signal being in the range of about 1 Volt to 50 Volts for providing a sensor signal, the reference signal being derived from a voltage differential between one or more of the conductors and a reference point that should, in use, be electrically isolated from the conductors; and progressing a switching device between a first mode and a second mode in response to the sensor signal wherein: in the first mode the input and output terminals are respectively electrically connected for allowing the load to receive power from the source via the switching device; and in the second mode the input and output terminals are electrically disconnected for preventing the source from supplying power to the load via the switching device.

According to a sixth aspect of the invention there is provided a method for electrically connecting a load to a power source, the method including:

providing at least two input terminals for electrically connecting with the power source;

providing at least two output terminal for electrically connecting with the load;

being responsive to a reference signal being within a predetermined range for providing a sensor signal; and being responsive to the sensor signal for progressing a switching device from a first mode to a second made wherein: in the first mode the input and output terminals are respectively electrically connected for allowing the load to receive power from the source via the switching device; and in the second mode the input and output terminals are electrically disconnected for preventing the source from supplying power to the load via the switching device.

According to a seventh aspect of the invention there is provided a method for electrically connecting a load to a power source, the method including:

providing at least two input terminals for electrically connecting with the power source;

providing at least two output terminal for electrically connecting with the load;

being responsive to a reference signal being within a predetermined range for providing a sensor signal; and being responsive to the sensor signal for progressing a switching device from a first mode to a second mode wherein: in the first mode the input and output terminals are respectively electrically connected for allowing the load to receive power from the source via the switching device; and in the second node the input and output terminals are electrically disconnected for preventing the source from supplying power to the load via the switching device.

According to an eighth aspect of the invention there is provided a method for electrically connecting a load to a power source, the method including:

providing at least two input terminals for electrically connecting with the power source;

providing at least two output terminals for electrically connecting with the load;

being responsive to a reference signal being within a predetermined range for providing a sensor signal; and being responsive to the sensor signal for progressing a switching device between a first mode and a second mode wherein: in the first mode the input and output terminals are respectively electrically connected for allowing the load to receive power from the source via the switching device; and in the second mode the input and output terminals are electrically disconnected for preventing the source from supplying power to the load via the switching device.

According to a ninth aspect of the invention there is provided a wiring system for carrying a mains supply from a mains source having at least two mains conductors, the system being installed at a site and including:

a transformer located at or near the site and having one or more primary windings for connecting to the mains conductors and one or more secondary windings to provides a site voltage that is substantially equal to the mains supply;

at least two site conductors that are installed at the site for electrically connecting with the one or more secondary windings for distributing the site voltage to predetermined locations about the site; and a floating conductor that is installed at the site for providing a common reference voltage with respect to one or more of the site conductors.

In an embodiment, one of the mains conductors is a mains neutral conductor that is earthed and one of the site conductors is a site neutral conductor that is not earthed. Preferably, the wiring system includes one or more of the control circuits referred to above. More preferably, the transformer is an isolation transformer.

According to a tenth aspect of the invention there is provided a wiring system for carrying a mains supply from a mains source having at least two mains conductors, the system being installed at a site and including:

a transformer located at or near the site and having one or more primary windings for connecting to the mains conductors and one or more secondary windings to provides a site voltage that is substantially equal to the mains supply;

at least two site conductors that are installed at the site for electrically connecting with the one or more secondary windings for distributing the site voltage to predetermined locations about the site; and a floating conductor that is associated with a load installed at the site for providing a reference voltage with respect to one or more of the site conductors.

According to a eleventh aspect of the invention there is provided a method of installing a wiring system at a site for carrying a mains supply from a mains source having at least two mains conductors, the method including:

locating a transformer at or near the site and having one or more primary windings for connecting to the mains conductors and one or more secondary windings to provides a site voltage that is substantially equal to the mains supply;

installing at least two site conductors at the site for electrically connecting with the one or more secondary windings for distributing the site voltage to predetermined locations about the site; and installing a floating conductor at the site for providing a common reference voltage with respect to one or more of the site conductors.

According to a twelfth aspect of the invention there is provided a method of installing a wiring system at a site for carrying a mains supply from a mains source having at least two mains conductors, the method including:

locating a transformer at or near the site and having one or more primary windings for connecting to the mains conductors and one or more secondary windings to provides a site voltage that is substantially equal to the mains supply;

installing at least two site conductors at the site for electrically connecting with the one or more secondary windings for distributing the site voltage to predetermined locations about the site; and installing at the site a floating conductor that is associated with a load for providing a reference voltage with respect to one or more of the site conductors.

According to a thirteenth aspect of the invention there is provided a control circuit including:

at least two input terminals for electrically connecting with a power source;

at least two output terminals for electrically connecting with a load;

a sensor having a sensor relay that is responsive to a reference signal being within a predetermined range for providing a sensor signal; and a switching device having a switching relay that is responsive to the sensor signal for progressing between a first mode and a second mode wherein: in the first mode the input and output terminals are respectively electrically connected for allowing the load to receive power from the source via the switching relay; and in the second mode the input and output terminals are electrically disconnected for preventing the source from supplying power to the load via the switching relay.

In an embodiment, the sensor relay is a low voltage DC relay. Preferably, the sensor relay includes a trigger voltage that is less than 50 Volts. More preferably, the trigger voltage is less than 35 Volts. In one embodiment, the trigger voltage is less than 12 Volts, while in another embodiment it is less than 5 Volts.

In an embodiment, the switching relay is a main relay. That is, the switching relay is rated for mains voltages and currents.

According to a fourteenth aspect of the invention there is provided a method for electrically connecting a load to a power source, the method including:

providing at least two input terminals for electrically connecting with the power source;

providing at least two output terminals for electrically connecting with the load;

being responsive with a sensor having a sensor relay to a reference signal being within a predetermined range for providing a sensor signal; and being responsive to the sensor signal with a switching device having a switching relay for progressing between a first mode and a second mode wherein: in the first mode the input and output terminals are respectively electrically connected for allowing the load to receive power from the source via the switching relay; and in the second mode the input and output terminals are electrically disconnected for preventing the source from supplying power to the load via the switching relay.

According to a fifteenth aspect of the invention there is provided a control circuit for a mains load having a component that, in normal use, is electrically isolated from a mains power source, the circuit including:

at least two input terminals for electrically connecting with the mains power source;

at least two output terminals for electrically connecting with the load;

a sensor that is responsive to a voltage between the component and one or more of the input terminals being within a predetermined range for providing a sensor signal; and a switching device that is responsive to the sensor signal for progressing between a first mode and a second mode wherein: in the first mode the input and output terminals are respectively electrically connected for allowing the load to receive power from the source via the switching device; and in the second mode the input and output terminals are electrically disconnected for preventing the source from supplying power to the load via the switching device.

In an embodiment, the component is a conductive portion of a housing for the load. However, in other embodiments, the component is a functional portion of the load. For example, in an embodiment where the load is an electric drill, the component is a combination of the stator and rotor as this combination is, in normal use, electrically isolated from mains power source. That is, the drill includes an electric motor with windings that, under normal conditions, arm the primary component that is connected with the mains power source. The rotor and stator, however, should be electrically isolated from that source.

According to a sixteenth aspect of the invention there is provided a method for electrically connecting a mains load to a mains power source, where the load has a component that, in normal use, is electrically isolated from the power source, the method including:

providing at least two input terminals for electrically connecting with the mains power source;

providing at least two output terminals for electrically connecting with the load;

being responsive to a voltage between the component and one or more of the input terminals being within a predetermined range for providing a sensor signal; and being responsive to the sensor signal with a switching device for progressing between a first mode and a second mode wherein: in the first mode the input and output terminals are respectively electrically connected for allowing the load to receive power from the source via the switching device; and in the second mode the input and output terminals are electrically disconnected for preventing the source from supplying power to the load via the switching device.

According to a seventeenth aspect of the invention there is provided a control circuit including:

at least two input terminals for electrically connecting with a power source;

at least two output terminals for electrically connecting with a load;

a switching relay having a switching coil that is selectively energised to progresses the relay between two modes wherein: in one of the modes the input and output terminals are respectively electrically connected for allowing the load to receive power from the source via the switching relay; and in the other mode the input and output terminals are electrically disconnected for preventing the source from supplying power to the load via the switching relay; and a sensor relay that is responsive to a predetermined condition for energising the coil of the switching relay.

In an embodiment, the sensor relay has a low voltage coil that is energised in response to the fault condition. Preferably, the low voltage coil is energised by a DC voltage. More preferably, the low voltage coil is energised by a DC voltage of about 1 Volt. In other embodiments, however, the DC voltage is energised by a different DC voltage.

According to an eighteenth aspect of the invention there is provided a method of connecting a load to a power source, the method including:

providing at least two input terminals for electrically connecting with the power source;

providing at least two output terminals for electrically connecting with the load;

selectively energising a switching coil of a switching relay to progresses the relay between two modes wherein: in one of the modes the input and output terminals are respectively electrically connected for allowing the load to receive power from the source via the switching relay; and in the other mode the input and output terminals are electrically disconnected for preventing the source from supplying power to the load via the switching relay; and being responsive to a predetermined condition with a sensor relay for energising the coil of the switching relay.

Unless the context clearly requires otherwise, throughout the description and the claims, the words 'comprise', 'comprising', 'include', 'including', and the like are to be construed in an inclusive sense as opposed to an exclusive or exhaustive sense; that is to say, in the sense of "including, but not limited to".

BRIEF DESCRIPTION OF THE DRAWINGS

Embodiments of the invention will now be described, by way of example only and not by way of limitation, in the accompanying drawings in which like references indicate similar elements. It should be noted that references to "an" or "one" embodiment in this disclosure are not necessarily to the same embodiment, and such references mean at least one. In the accompanying drawings:

FIG. 1 is a schematic representation of a control circuit according to the invention and for use with a two pin electrical appliance and a single phase low current domestic mains supply having a phase to neutral supply voltage is about 240 Volts;

FIG. 2 is a schematic representation of a control circuit similar to that of FIG. 1, but for use with a three pin electrical appliance;

DETAILED DESCRIPTION OF THE EMBODIMENTS

Figure 3:
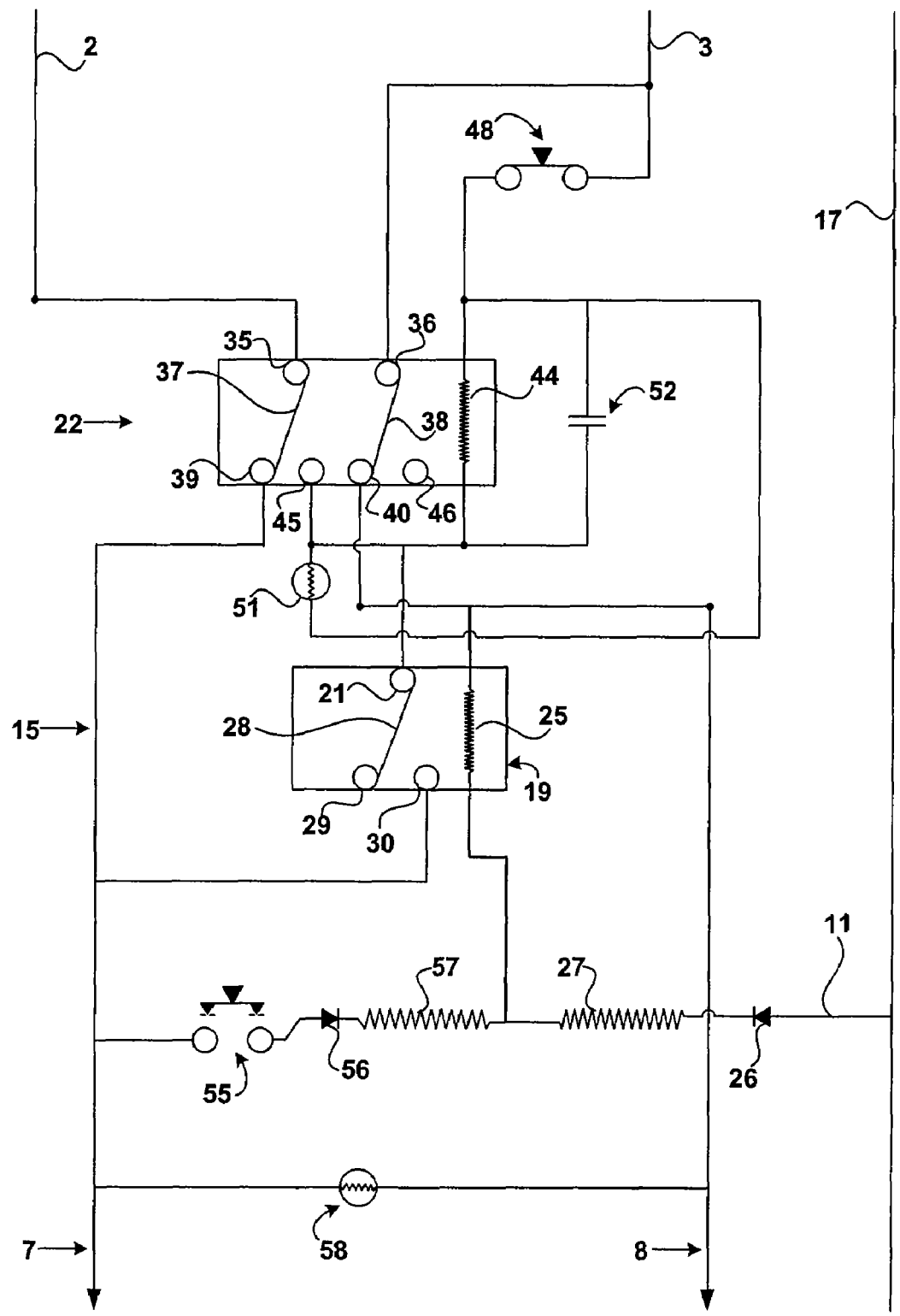
FIG. 3 is a schematic representation of the control circuit of FIG. 2.

Referring to FIG. 1, there is illustrated an embodiment of the invention in the form of a control circuit 1. Circuit 1 includes two input terminals 2 and 3 for respectively electrically connecting with the active and neutral conductors 4 and 5 of a mains power source 6. Two output terminals 7 and 8 electrically connect with a load in the form of a two pin domestic electrical appliance 9. While not explicitly shown, conductors 4 and 5 terminate at a domestic power outlet socket, and terminals 7 and 8 are incorporated into a two pin plug for insertion into that socket. That is, terminals 7 and 8 include elongate bundled conductors for extending between the outlet socket it and the circuit.

Appliance 9 has a conductive component, in this instance a housing 10 that, under normal operating conditions, is electrically insulated or otherwise electrically isolated from conductors 4 and 5. The housing provides a reference point for circuit 1, and is electrically connected to that circuit by way of a conductor 11. It will be appreciated that, in this embodiment, circuit 1 is mounted within housing 10. However, in other embodiments, circuit 1 is mounted otherwise.

Referring to FIG. 2, there is illustrated another embodiment of the invention for use with a three pin domestic appliance 14, and where corresponding features are denoted by corresponding reference numerals. Particularly, a control circuit 15 is similarly disposed within housing 10, although conductor 11 is connected to a third conductor 17 that is bundled together with the other two conductors 4 and 5. If appliance 14 includes a metal housing or other major conductive element, this is electrically connected to conductor 17, either by conductor 11 or otherwise.

While in a typical site having a mains wiring system, conductor 17 is connected to an earth stake or other earth point at the site, in this embodiment conductor 17 is left floating to provide a reference similarly to that provided by housing 10 of the FIG. 1 embodiment. Otherwise, the operation of circuits 1 and 15 is the same.

Reference is now made to FIG. 3 where there is illustrated a more detailed schematic of circuit 15. It will be appreciates that with the exception of the connection of conductor 11, circuit 1 is identical.

Circuit 15 includes a sensor having a low voltage miniature relay 19 with a 5 nominal Volt DC coil is responsive to a reference signal provided on conductor 11 being within a predetermined range for providing a sensor sign to a terminal 21 of relay 19. A switching device, including a mains rated relay 22, is responsive to the sensor signal at terminal 21 for progressing between a first mode—as shown in FIG. 3—and a second mode wherein: in the first mode the input a 2 and 3 are respectively electrically connected to output terminals 7 and 8 for allowing appliance 14 to receive power from source 6 via relay 22; and in the second mode terminals 2 and 3 are electrically disconnected from respective terminals 7 and 8 for preventing source 6 from supplying power to appliance 14 via relay 22.

Relay 19 includes a coil 25, one end of which is connected to conductor 11 via an IN4004 diode 26 and a metal film type 8.2 kΩ resistor 27 that has a tolerance of 1%. The other end is connected to output terminal 8 and, via relay 22, neutral conductor 3. Coil 25 is a low voltage coil with a notional energising voltage of 5 Volts DC. Typically, however, the coil is sufficiently energised once an instantaneous voltage of about 3 Volts appears across coil 25. This particular relay is a highly sensitive low voltage relay and has shown, notwithstanding its low voltage rating, to be able to withstand the rigours of being exposed to up to the mains voltage. In this embodiment, where the mains voltage is about 240 Volts AC, it has been found that relay 19 is able to undertake many tens of thousands of switching operations without resistor 27 in place, and many hundreds of thousands when the resistor is in place.

It will be appreciated by those skilled in the art that in other embodiments other low voltage relays are used having nominal energising voltages of other than five volts DC.

Relay 19 includes a contact 28 that is a normally open type contact which, when coil 25 is not emergised, extends between terminal 21 and another terminal 29. Under normal steady state conditions, coil 25 is not energised, as conductor 11 is floating, and terminal 3 is electrically connected to the neutral conductor of the mains source. That being so, contact 28 remains as shown in FIG. 3.

Relay 19 also includes a terminal 30 that is electrically connected to terminal 7 and, under normal operating conditions, terminal 2 of source 6 via relay 22. When coil 25 is energised due to a voltage appearing on conductor 17, contact 28 toggles to the closed position such that it extends between terminals 21 and 30. This has the effect of connecting terminal 21 to terminal 2, wherein the voltage signal at terminal 21 under those conditions defining the sensor signal.

Relay 22 includes two terminals 35 and 36 for respectively electrically connecting with conductors 2 and 3. Extending from these terminals are respective contacts 37 and 38 that are shown when normal operating conditions prevail, in that they are engaged with respective output terminals 39 and 40 so as to electrically connect terminal 2 with terminal 7, and terminal 3 with terminal 8.

Relay 22 also includes a coil 44, a terminal 45 that is electrically connected to one end of coil, and a terminal 45 that is floating. The other end of coil 44 is electrically connected to terminal 3—and hence the neutral conductor— via a manual actuated normally closed reset switch 48.

Coil 44 is rated for the voltage provided by source 6, which, in this embodiment, is 220/240 Volts AC. However; other equivalent relays are used in other embodiments.

Under normal operating conditions, coil 44 is not energized, and contact 37 extends between terminals 35 and 39, while contact 38 extends between terminal 36 and terminal 40. However, once the sensor signal appears at terminal 21, coil 44 is energized and: contact 17 electrically connects terminals 35 and 45; and contact 38 electrically connects contacts 36 and 40. That being so, terminal 7 is electrically disconnected from terminal 2, and terminal 8 is electrically disconnected from terminal 3. Hence, applicant 14 is electrically disconnected from source 6. Moreover, while such time as terminals 2 and 3 are electrically connected to the mains supply voltage from source 6, coil 44 remains energized and thereby maintaining relay 22 in the state other than that illustrated in FIG. 3.

Circuit 15 also includes a 220/240 Volt miniature type fault lamp 51 in parallel with coil 44 for indicating a fault condition. That is, lamp 51 will be illuminated to provide a visual indication that appliance 14 has been subject to a potentially unsafe condition. Additionally, circuit 15 also includes in parallel with coil 44 a 275 Volts AC polyester type 0.22 µF capacitor 52 to short out any high frequency transients that may arise during a switching of relay 19 and 22.

Circuit 15 includes a miniature type normally open mains test switch 55 that at one side is connected to terminal 7, and at the other side that is electrically connected in series with a IN4004 diode 56 and a metal film type 8.2 kΩ current limiting resistor 57 that has a tolerance of 1%. Also included within circuit 15 is a 220/240 Volt miniature filament lamp 58 that extends between terminals 7 and 8 for providing a visual indication that the mains voltage is available to appliance 14.

In other embodiments use is made of different electrical components or combinations of components that provide the same functionality.

In use and under normal operating conditions, as shown in FIG. 3, terminal 2 and terminal 3 are respectively electrically connected to terminals 7 and a via relay 22. Lamp 58 is also illuminated due to the potential difference between terminals 7 and 8.

In the event that there is a fault condition, in that there is a potential difference between conductor 11 and the no conductor 5, this will cause coil 25 to become energised. Reasons for such a fault condition are many and varied, and often depend upon the appliance in question. Taking as an example, an appliance such a hairdryer that includes motor windings and heater windings that are subject to the mains voltage, and a conductive metal casing or housing that is insulated from the mains voltage and which is electrically connected to conductor 11. In a humid environment the risk of a conductive path being established between one or more of the windings or the heating elements and the housing is increased. Should that path be established—either due to condensation or by the appliance being inadvertently immersed in water—there will immediately appear a voltage differential between the neutral conductor (which is electrically connected to one side of coil 25) and the housing (which is electrically connected via conductor 11 to the other side of the coil). If the conductive path is of a relatively low resistance, and therefore a high percentage of the mains voltage appears across coil 25, it will very quickly toggle from the state shown in FIG. 3 to the alterative state.

While coil 25 has a nominal energisation voltage of about 5 Volts DC, it will typically toggle at about 3 Volts DC. Accordingly, as soon as an instantaneous voltage of about 4 Volts appears on conductor 17, relay 19 will toggle from one state to the other. Accordingly, it is only if the conductive path is of a relatively high resistance, such that the voltage on conductor 17 is less than about 4 Volts in this embodiment, that circuit 15 will remain operating normally. The circuit is able to be made more sensitive through removing resistor 27, although this may reduce the useful life of relay 19.

Another alternative for reducing the lower limit at which coil 25 energises, is to omit diode 26 and simply have either resistor 27 (if included) or coil 25 directly electrically connected to conductor 11. Preferably, this would also be accompanied by the omission of test switch 55, diode 56, resistor 57 and diode 26.

Another alternative for reducing the lower limit at which coil 25 energises, is to make use of a relay having a coil with a lower nominal energisation voltage. Clearly, such a relay would also have to withstand the rigours of being subject to the mains voltages.

The inclusion of diode 26 in this embodiment has the effect of half wave rectifying any AC voltage on conductor 17. Accordingly, if the mains voltage appears on conductor 17 due to a fault condition, it will only be once the positive half cycle of the AC signal progresses that coil 25 will be energised and relay 25 toggles from one state to the other. In any event, due to the low threshold for energising coil 25—that is, 5 Volts DC when a typical fault condition will place close to the full mains AC voltage on conductor 17—it toggles very quickly such that the sensor signal is provided at terminal 21 correspondingly quickly. The appearance of the full mains voltage at terminal 25 ensures that coil 44 is quickly energised and contacts 37 and 38 toggled from the state shown in FIG. 3 to the alternate state. Once so toggled, lamp 51 is illuminated and coil 44 maintained in an energised condition while such time as the active conductor 4 is connected to terminal 2.

It his been found by the inventors that the above embodiment allows a fault condition to persist for less than about 30 msec for a 60 Hz mains supply frequency. This includes about 6 to 14 msecs for the fault condition to be detected and contact 28 to move to the other state. There is an additional delay of about 8 to 16 msec as relay 22 toggle states. Statistically, however, the mean delay is typically less than this. This is presently understood to be due to:

1. Relay 19 having such a low threshold for toggling relative to the likely fault voltage. That is, once about 30 to 40 Volts DC appears on conductor 17 relay 19 will toggle. More typically, a fault condition exposes conductor 17 to substantially all the ms voltage and as such, coil 25 is quickly saturated. In embodiments where resistor 27 has a lower resistance, or is omitted, the reaction time of relay 19 will be improved.
2. Coil 44 of relay 22 being exposed quickly to the full mains voltage: initially via terminal 21; and subsequently via terminal 45. That is, coil 44 is maintained in parallel with source 6, with minimal series resistance to limit the energising current.

The above embodiment has been found to operate more quickly than typical solid-state protection equipment that is installed in domestic installations.

The longevity of relay 19 is also understood to arise from the fact that even when the maximum coil current does flow, it will only do so for an extremely short period. Accordingly, there is little time for negative thermal effects to take place within relay 19. With current limiting resistor 27 in place, additional protection is offered.

Once relay 22 toggles state in response to the sensor signal, coil 25 will de-energise and contact 28 will return to the normally open position shown in FIG. 3. Moreover, as terminals 7 and 8 are now isolated from the mains voltage, lamp 58 will be extinguished, indicating to the user of the appliance that power is not being supplied to the appliance. In addition, lamp 51 will be illuminated to indicate a fault.

If, following a fault condition, the user wishes to reset circuit 15, this is achieved by manually depressing switch 48 to progress it into an open state. This has the effect of allowing coil 44 to discharge through capacitor 52 and lamp 51. Once this occurs, contacts 37 and 38 row to the state shown in FIG. 3. If terminals 2 and 3 are still electrically connected with conductors 4 and 5 respectively, and the fault condition has persisted, relay 19 will again, and quickly, provide the sensor signal at terminal 21. That being so: relay 22 will again toggle to isolate terminals 7 and 8 from source 6. However, if the fault condition is removed, terminals 7 and 8 will be electrically reconnected with source 6 via relay 22, and lamp 58 will illuminate to indicate normal operating conditions.

Switch 55 provides the user with the ability to test circuit 15 for correct operation. By manually depressing switch 55 and progressing it to a closed state, the mains voltage at terminal 7 is passed to coil 19, simulating fault conditions. When this occurs, lamp 58 is extinguished, and lamp 51 is illuminated.

It will be appreciated that control circuit 1 operates similarly to that described above for circuit 15. The substantive difference being that for circuit 15 the reference voltage is obtained from the conductor 17 which coextends about the site with conductors 4 and 5, and is a shared reference for all three pin appliances in use at that site. Circuit 1, however, makes use of a reference that is typically a conductor associated with the appliance and that is available to be, or at risk of being, engaged by the user—for example a metal housing or a drill chuck—and which is, consequently, to remain isolated from the mains voltage.

Figure 4:
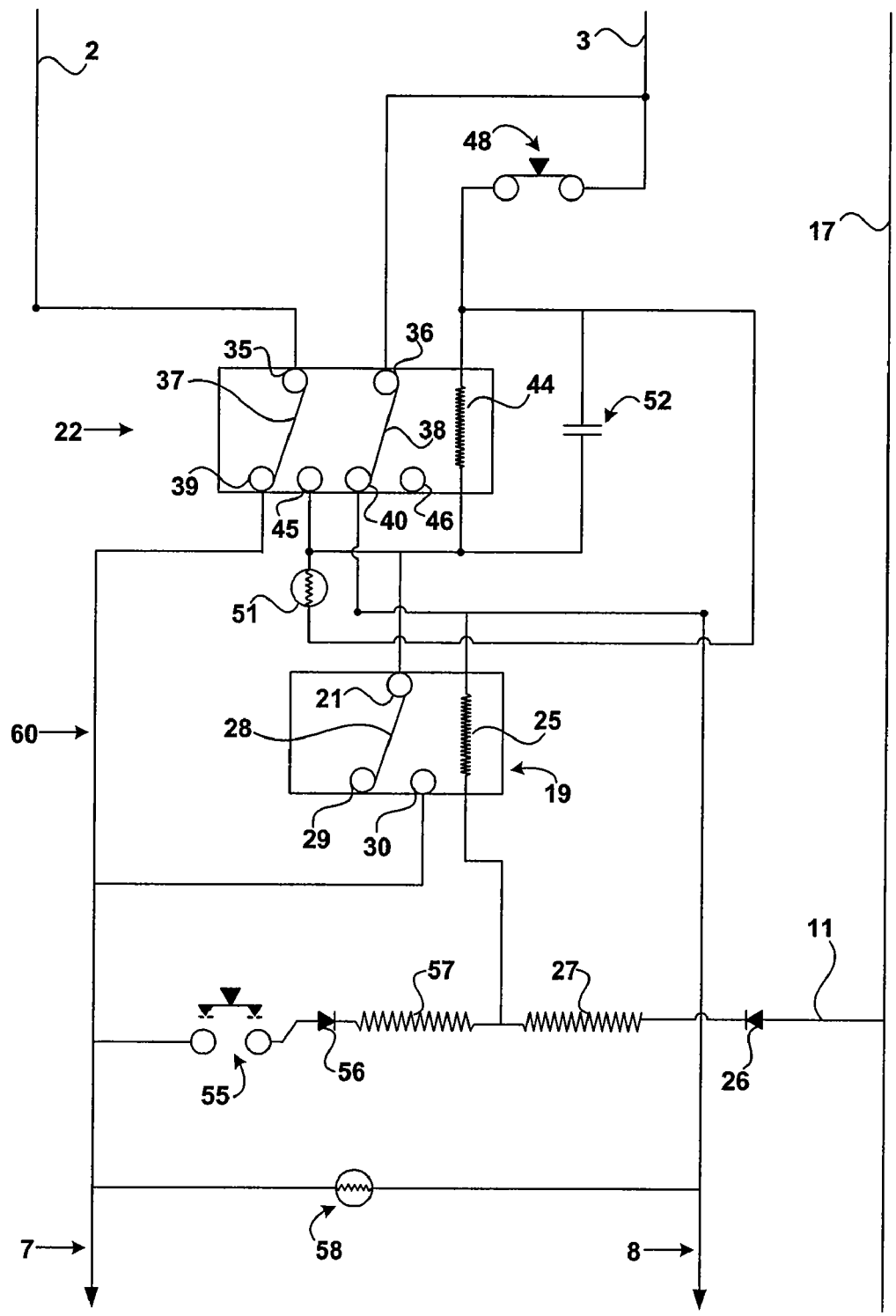
FIG. 4 is a schematic representation of a control circuit that is similar to FIG. 3 but applied to a mains supply where the phase to neutral voltage is about 110 Volts.

A further embodiment of the invention, in the form of a control circuit 60, is illustrated in FIG. 4, where corresponding features are denoted by corresponding reference numerals. Circuit 60 includes a similar configuration and operation to circuit 1 and 15, although a number of the components are different to best accommodate the lower mains voltage of 110/120 Volts AC as opposed to the 220/240 Volts AC mains voltage of FIG. 3. The components that are different include: relay 22 which has a coil 44 that is rated to 110/120 Volts; resistors 27 and 57 that are 4.7 kΩ metal film resistors of 1% tolerance; and lamps 51 and 58 that are rated at 110/120 Volts. Due to the lower maximum voltages to which relay 19 will be exposed during a fault condition, resistors 27 and 57 are able to be of a lesser value and still adequately limit the maximum current in coil 25.

It will be appreciated that circuit 60 is applicable to both the FIG. 1 and FIG. 2 configurations, and operates similarly to circuits 1 and 15 respectively, save for the lower mains voltages.

Figure 5:
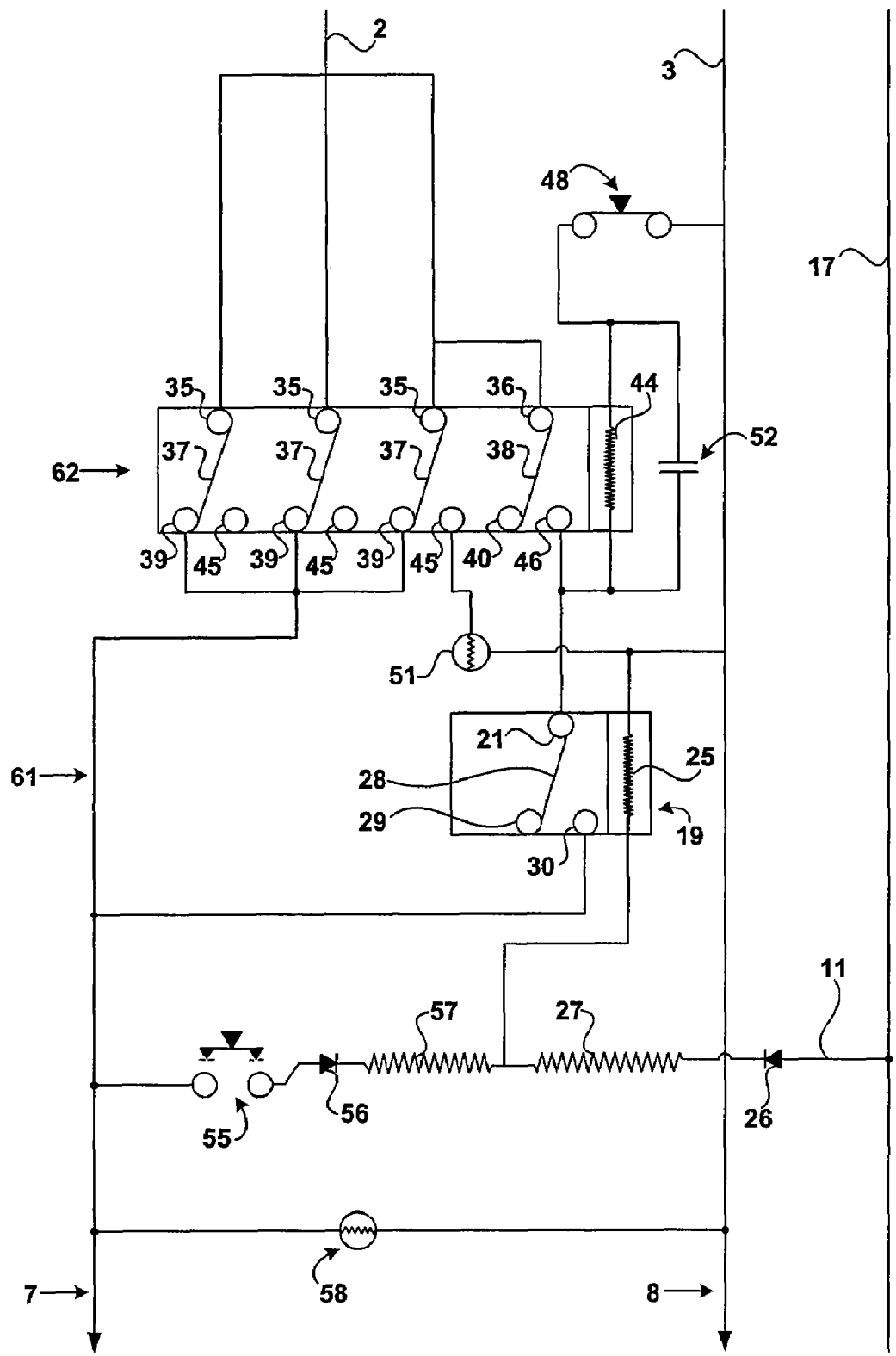
FIG. 5 is a schematic representation a control circuit according to an embodiment of the invention for use with a single phase high current domestic electrical appliance, where the phase to neutral mains supply voltage is about 240 Volts.

For electrical appliances, such as motors for pumps, winches, or other heavier duty equipment, relay 22 will not have sufficient current carrying capacity. In these circumstances, and using circuit 15 as an example, circuit 15 is replaced by a corresponding circuit 61 that is illustrated in FIG. 5 where corresponding features are denoted by corresponding reference numerals. The components in circuit 61 are similar to those in circuit 15, and are also arranged similarly. However, relay 22 has been substituted by relay 62 that includes four contact sets, three of which are used in parallel to pass mains voltages and currents to the appliance or other load. This parallel combination of contacts increases current rating of circuit 61 over that of circuit 15. In other embodiments, however, an increase in current capacity is achieved through use of a higher current rated relay, or through placing two relays 22 in parallel. Additionally, higher current capacities are achieved in alternative embodiments by placing two or more like relays 62 in parallel.

Figure 6:
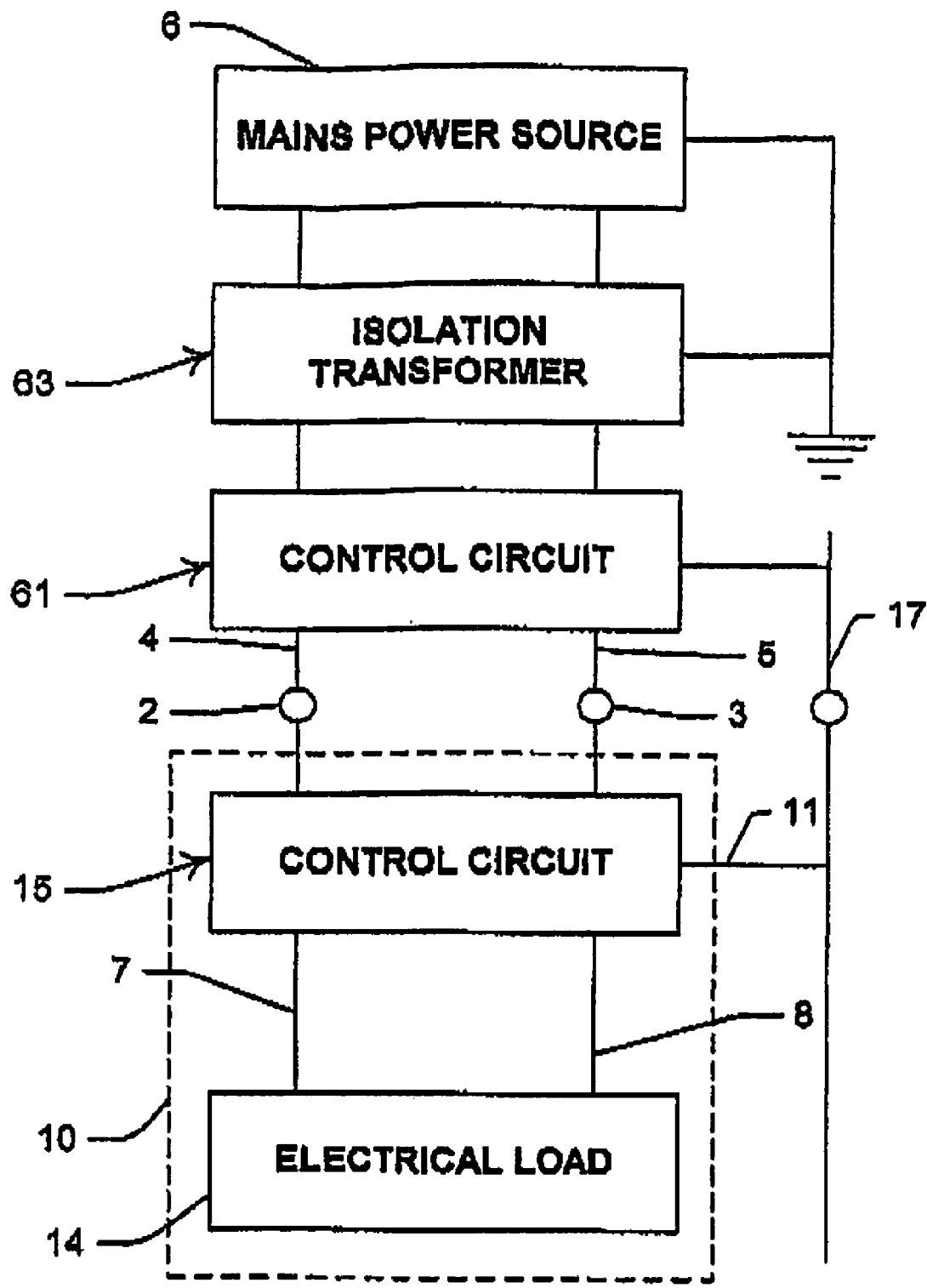
FIG. 6 is a schematic representation of a site that is wired to receive the circuit of FIG. 5 as a protection device for all the appliances at that site.

An alternative use of circuit 61 is shown in FIG. 6. Particularly, circuit 61 is disposed between an isolation transformer 63 and circuit 15. It will be appreciated that all the mains current for the site is drawn through relay 61, and a number of appliances 14 are connected in parallel at the site, some with an associated circuit 15, others without. If a fault condition exists, it will not only ensure that a protected appliance—that is an appliance with a dedicated circuit 15—is isolated, but also that all appliances are isolated due to circuit 61 triggering. That is, the fault condition is common to all control circuits due to the shared nature of conductor 17. It will be appreciated that conductor 17 is not earthed but floating, whereas source 6—and the associated transmission lines and generation facilities—and the primaries of transformer 63 are earthed in accordance with the standards of a multiple earthing neutral (MEN) wiring system.

Figure 7:
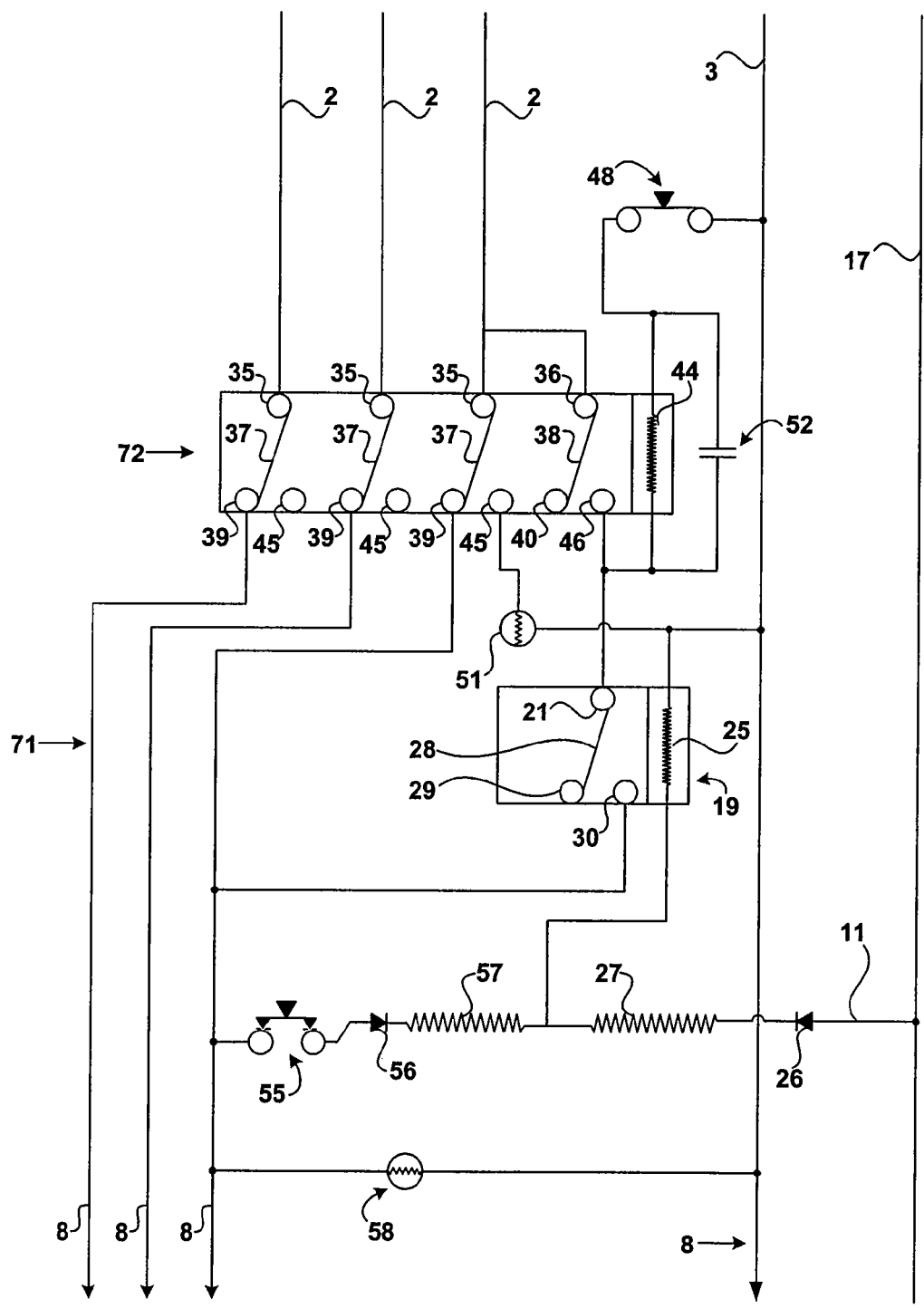
FIG. 7 is a schematic representation a control circuit according to an embodiment of the invention for use with a three phase high current domestic electrical appliance, where the phase-to-phase mains supply voltage is about 415 Volts.

While the above embodiments have focus upon single phase electrical loads such as domestic or commercial appliances, the invention is also applicable to three phase loads such as motors, pumps, air conditioning and heating units, and the like. Reference is made to FIG. 7 where there is illustrated a control circuit 71 and where corresponding feature are denoted by corresponding reference numerals. Circuit 71 is similar to circuit 15, although some of the components have been varied due to the higher voltages involved. That said: the configuration of two relays—one low voltage relay connected to the neutral conductor, and a mains relay through which the load current flows—is retained. As there are three active phases, relay 22 is substituted by a relay 72 that includes four contacts, of which accommodate the respective phases.

As coil 25 of relay 19 is, at worst, exposed to a phase-to-neutral voltage, resistors 27 and 57 remain unchanged from the FIG. 3 embodiment. The phase-to-neutral voltage in the context of a mains supply is reference to the voltage between an active conductor and the neutral conductor. For a single-phase supply there is only one "phase" or active conductor, while in a multi-phase supply there are usually three "phase" or active conductors. Other component changes include: relay 72 being rated at 415/440 Volts AC; diodes 29 and 56 being upgraded to IN4084 type with a 600 Volts AC rating; capacitor 52 being upgraded to a 1000 Volts AC rating; and filament lamps 51 and 58 being upgraded to 415/440 Volts AC ratings. Otherwise, the operation of circuit 71 is very similar to that of circuit 15.

Figure 8:
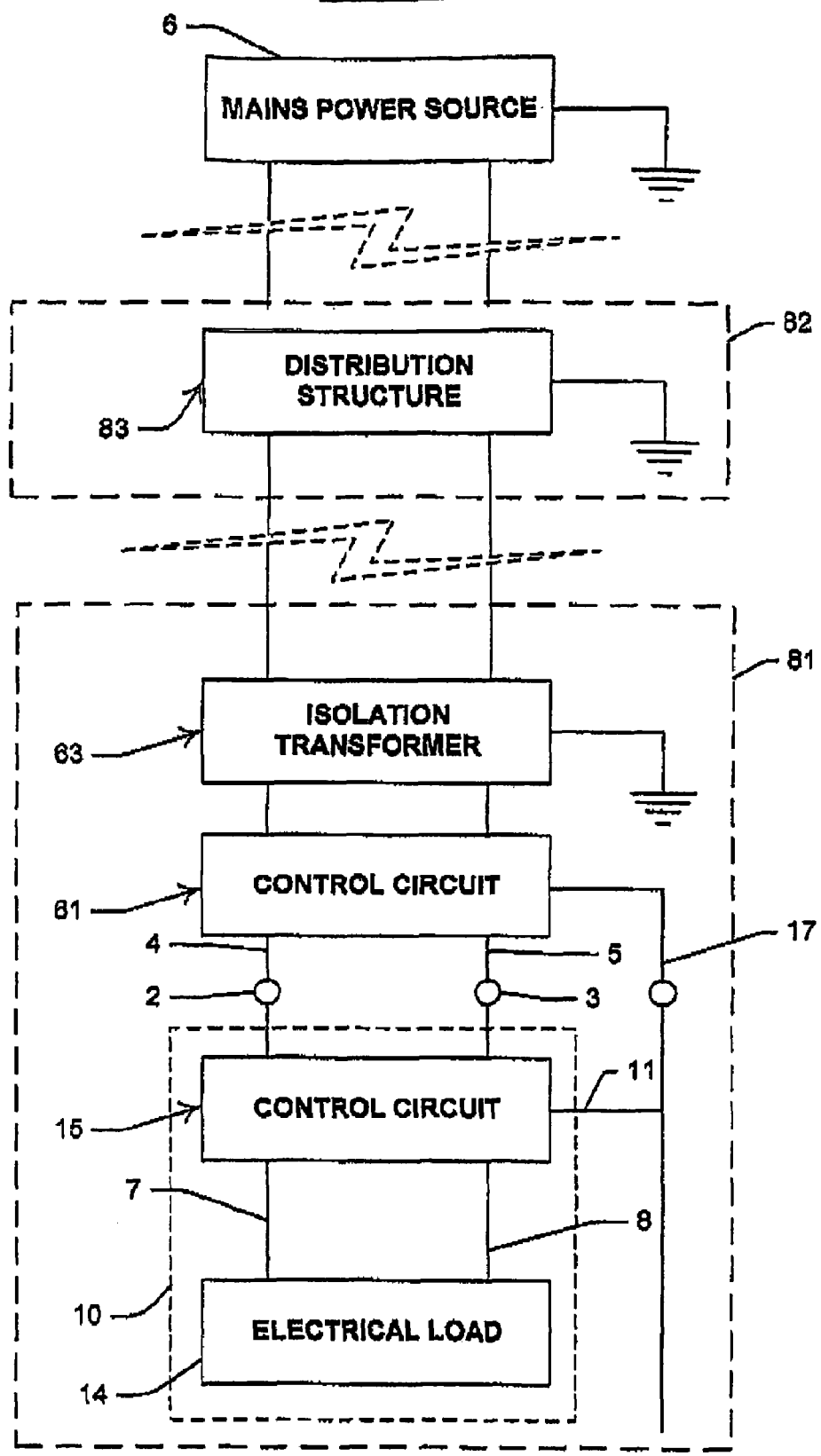
FIG. 8 is a schematic representation of an electricity distribution grid that provides electric power to a remote site that includes a wiring system in accordance with a preferred embodiment of the invention, wherein the site also includes the control circuits of FIG. 6.

Reference is now made to FIG. 8 where there is illustrated schematically a further embodiment of the invention and where corresponding features are denoted by corresponding reference numerals. Particularly, FIG. 8 illustrates power source 6, in the form of an electric power generation site, and a remote power consumption site 81, as represented by the area bounded by the correspondingly numbered broken line. Source 6 and site 81 are electrically interconnected by a power distribution system 82 that includes a plurality of spaced apart distribution structures 83 (only one shown for clarity) such as towers, poles and others that suspend or otherwise support the plurality of conductors that carry the electrical power between the generations site and the consumption site. Each or most of the distribution structures include an earth stake or other earthed reference that is linked to the neutral conductor that is supported by that structure. This provides an MEN system.

However, at site 81, the electrical power provided by source 6 is fed to transformer 63, where it appear on the secondary windings as an isolated source. In prior art wiring systems, conductor 17 at a consumption site would be earthed. However, in the present embodiment, site 83 includes a conductor 17 that is floating, and which is available to be electrically connected with one or more elements of one or more appliances to be supplied power at site 83. This common floating reference across a plurality appliances at that site allows all control circuits of the preferred embodiments used at that site to be responsive to a fault and thereby provide an increased level of safety. As discussed above, the control circuits of the preferred embodiment are able to be adapted for integration with a specific electrical appliance or installed in an overall protective role in a switchboard or the like.

It will be appreciated that there are a plurality of appliances 14 at site 81, each of which is connected in parallel with the terminals 2 and 3. Some of these appliances, such as the one illustrated include individual control circuits 15 or the like, while other appliances do not. In any event, in the presence of a fault condition, those latter appliances will still be isolated due to the operation of circuit 63.

It will be appreciated that, as with the prior art, if a fault condition arises at a two pin appliance used at site 83 that does not have a separate control circuit in accordance with the invention, the fault condition will remain until a conductive return path to the neutral is established.

Figure 9:
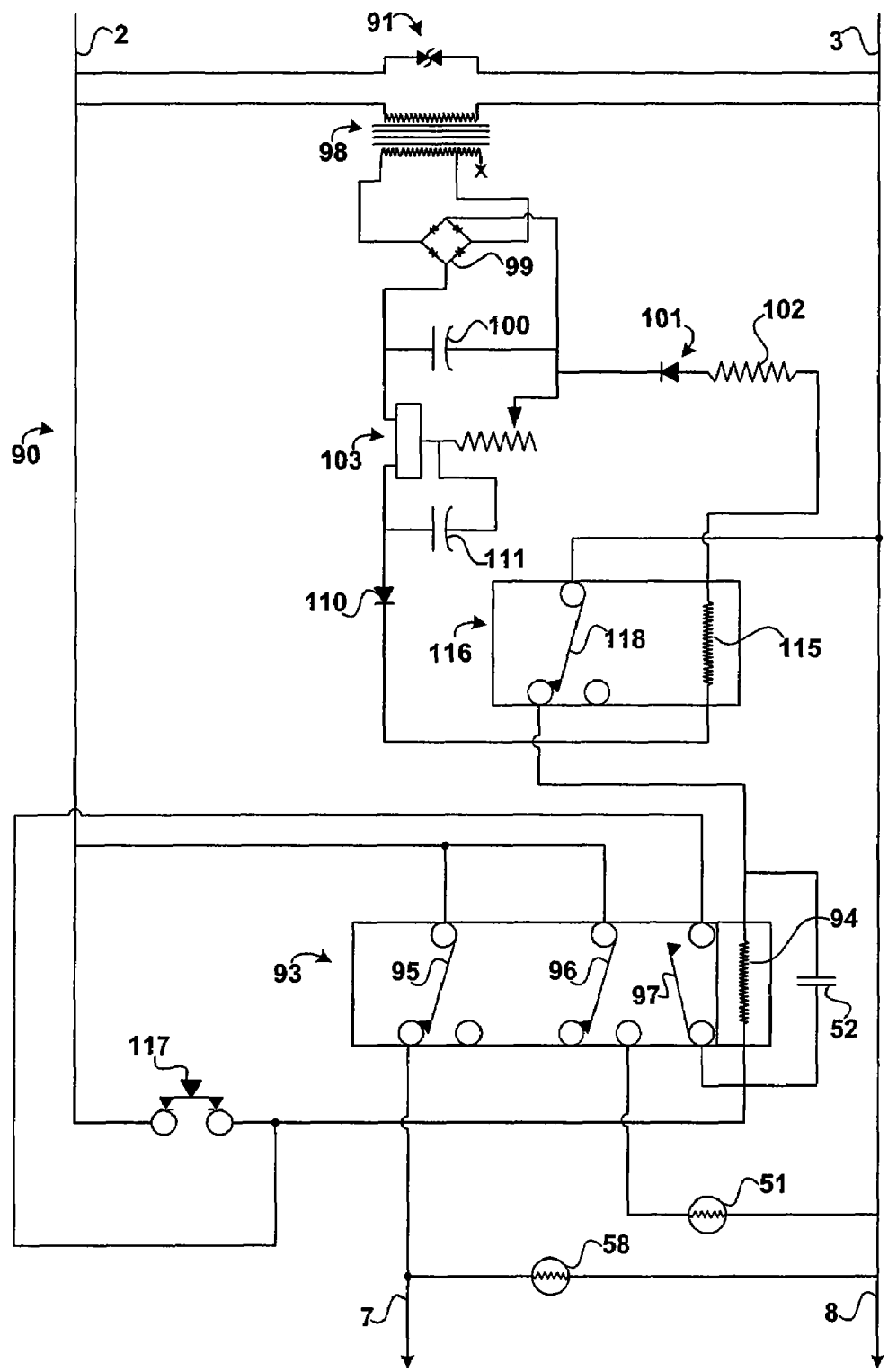
FIG. 9 is a schematic representation of a control circuit according to another embodiment of the invention for use with a single phase low current domestic electrical appliance, where the phase to neutral mains supply voltage is about 240 Volts.

A further embodiment of the inventions is illustrated in FIG. 9, where corresponding features are denoted by corresponding reference numerals. Particularly, a control circuit 90 is intended for disposing between source 6 and a load in the form of appliance 14 in substation for circuit 1 of FIG. 1. In other embodiments, circuit 90 is configured for installation in a switchboard of a power consumption site 83 or otherwise. However, in this embodiment, circuit 90 is designed for a lower current application and to a specific species of electronic appliance that is sensitive to over or under voltage conditions. Examples of such appliances include specific computer devices and peripherals, various communications devices, precision measuring equipment and other electronic devices such as high quality video and sound reproduction equipment. Typically, devices that process signals digitally have an accuracy of processing that is sensitive to variations in power supply voltages. However, there are also many analogue devices that are similarly sensitive.

Circuit 90 includes a 275 Volts AC 20 Amp varistor 91 that has a 20 mm diameter and which is connected in parallel with terminals 2 and 3 for detecting a severe over-voltage condition—in the order of 275 Volts—at those terminals. In the presence of such an over-voltage condition, varistor 91 reverts to a low resistance state resulting in a large current being passed through the terminals and the triggering of a standard current protection device that is disposed further back along the power supply chain. Accordingly, an over-voltage will not be passed through to the appliance or other load that is connected in parallel with terminals 7 and 8.

Circuit 90 also includes a mains relay 93 having a coil 94 that, under normal operating conditions, is energised by the mains voltage to maintain three contacts 95, 96 and 97 in the positions shown in the Figure.

A 240 Volt primary center tapped 9/0/9 Volts AC 150 mAmp transformer 98 is placed in parallel with terminals 2 and 3 for providing an AC voltage of between 0 and 6 Volts via:

A bridge rectifier, in the form of a WO4 mini bridge rectifier 99 that is rated at 400 Volts (max).
An RB electrolytic capacitor 100 that is rated at 100 µF at 25 Volts DC.
A IN4004 diode 101.
A 6 Ω 1 Watt resistor 102 that has a tolerance of 10%.

This voltage is regulated by a voltage regulator 103 that, in this embodiment, is a 7805 regulator of the positive type. Regulator 103 has a set point that is able to be adjusted by correspondingly adjusting a 10 kΩ linear potentiometer 104 that is rated at 0.5 Watts. This adjustment allows circuit 90 to be more easily applied to a variety of appliances, or to different mains voltages.

A IN4004 diode 110 and a RB electrolytic 220 µF.25 Volts DC capacitor 111 filter the voltage provided by regulator 103 and apply the resultant filtered voltage provided by regulator 103 and apply the resultant filtered voltage to one end of a coil 115 of a miniature type relay 116. The other end of coil 115 is connected in series with resistor 102. Relay 116 is like relay 19.

For predetermined values of voltages at between terminal 2 and 3, coil 115 will remain de-energised. However, once the input voltage moves outside that range, the voltage provided by regulator 103 will rise such that coil 115 is energised sufficiently to toggle a contact 118 from the state shown to the alterative state. Once that occurs, coil 94 of relay 93 will be floating and hence that coil will be de-energised, and contacts 95, 96 and 97 will toggle to their respective alternative states. This, in turn, will isolate terminals 7 and 8 from terminals 2 and 3, while also ensuring that lamp 51 is illuminated, while lamp 58 is extinguished.

Circuit 90 also includes a normally closed reset button 117 for allowing a user to manually reset the circuit after a fault condition has been remedied.

Figure 10:
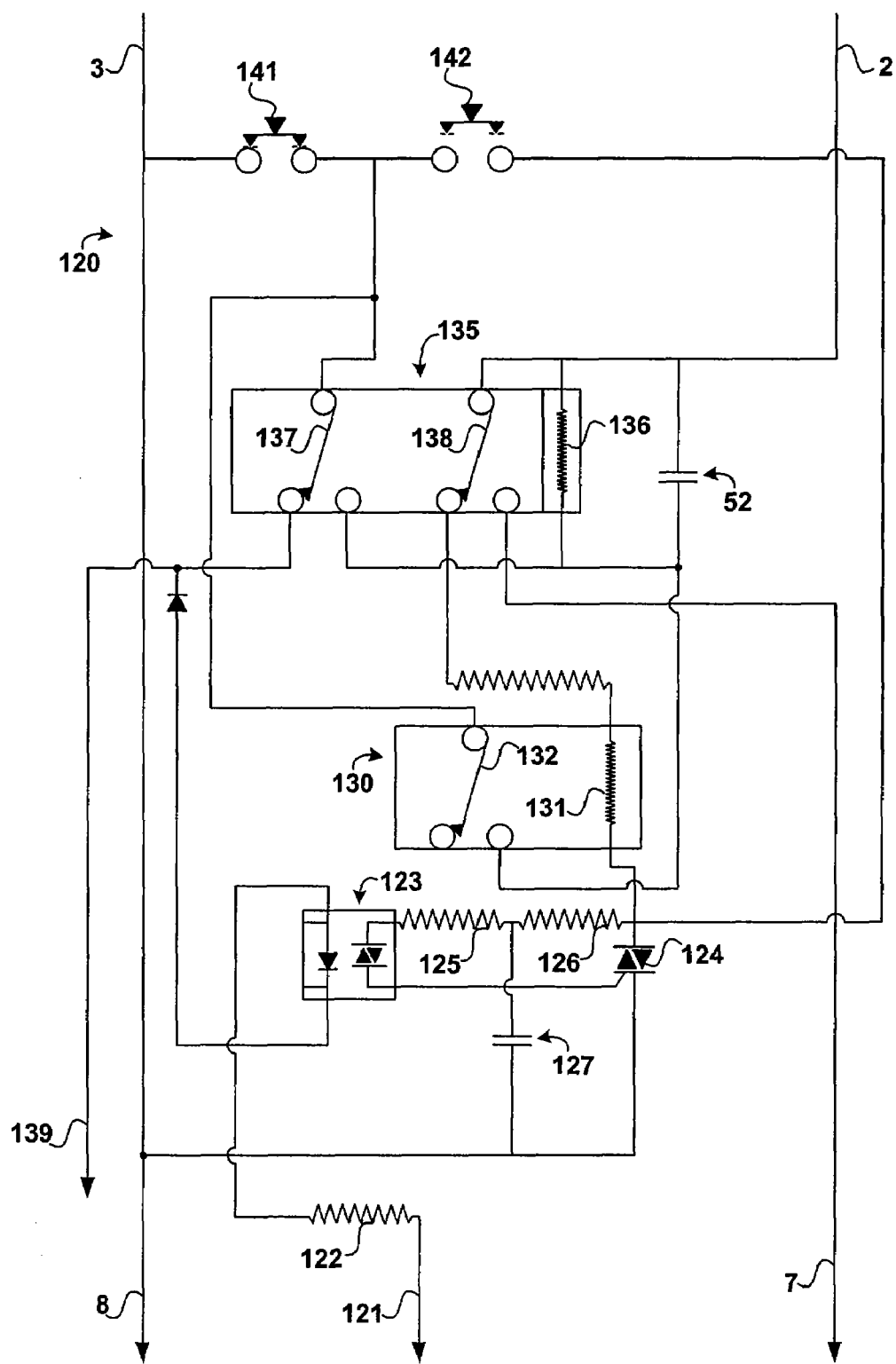
FIG. 10 is a schematic representation of a control circuit according to a further embodiment of the invention for use with a single phase low current domestic electrical appliance, where the phase to neutral mains supply voltage is about 240 Volts.

A further embodiment of the invention, in the form of a control circuit 120 is provided in FIG. 10, and where corresponding features are denoted by corresponding reference numerals. Circuit 120 includes terminals 2 and 3 that are electrically connected to a 240 Volts mains power source and terminals 7 and 8 that are connected to a load in the form of an alarm siren and warning lights (not shown). In other embodiments, the load is a different device or appliance. While the embodiments referred to above under normal operating conditions ensure the mains voltage is supplied to the load and interrupt that supply only if predetermined conditions exist, this embodiment operates in a different sense. More particularly, under normal operating conditions the mains supply is isolated from the load and it is only under predetermined conditions that that mains supply is connected with the load.

The circuit also includes a sensor in the form of a conductor 121 that is electrically connected with an external component that, under predetermined conditions, provides a voltage signal. In this embodiment, conductor 121 is electrically connected to a component in the form of a common 9 Volt domestic smoke detector (not shown). Under smoke free conditions, the detector does not apply a voltage to conductor 121. However, when the detector detects a smoke condition it provides a 9 Volts DC signal to conductor 121 which, in turn, is feed by series current limiting resistor 122 to an LED side of a triac opto-coupler 123 such that the coupler is progressed to a conductive state. Resistor 122 is a 56 Ω 0.5 Watt metal film type resistor, while coupler 123 a type MOC 3020/3021 that is contained in a 6 pin package.

Coupler 123, in the conductive state, allows a current flow sufficient to trigger a triac 124. Two biasing resistors 125 and 126 are chosen to set the sensitivity of triac 124, while a capacitor 127 is used to short any undesirable switching transients. In this embodiment, traic 124 is a type BT 137F (in a TO-220 case) that is rated at 600 Volts AC and 8 Amps. Resistors 125 and 126 are each 470 Ω metal film resistors that are rated at 0.5 Watts. Capacitor 127 is a polyester type capacitor that is rated at 0.01 µF at 600 Volts AC. In other embodiments alternative components and values are used.

A miniature 5 Volts DC relay 130 includes coil 131 that, upon triac 124 being triggered, is quickly and easily energised as it is subjected to substantially the full mains voltage. This toggles a contact 132 from the state shown in FIG. 10 to the alternative state (not shown). Relay 130 is similar to relay 19, but in other embodiments alternative relays are used.

A mains rated relay 135 includes a coil 136 that under normal conditions is not energised. However, once contact 132 of relay 130 toggles to the alternative state, coil 136 is subject to the full mains voltage and quickly toggles its two contacts 137 and 138 from the normal state shown, to the alternative state (not shown). Once this occurs, the mains voltage appearing at terminals 2 and 3 is transferred to terminals 7 and 8. As such, the alarm siren and warning lights are provided with mains power and activated to alert those in the vicinity of the smoke condition. In other embodiments, however, the alarm siren and warning lights are at a location other than near the smoke condition.

Once relay 135 switches or toggles between states, coil 131 of relay 130 de-energises and contact 132 returns to the state illustrated in FIG. 10.

Circuit 120 also includes an output signal conductor 139 that is connected to external circuitry (not shown). Accordingly, with conductor 121 being held at or about 9 Volts, and relay 135 toggled from the resting state, the external circuitry is alerted to the smoke condition and is able to amplify the condition. For example, the external circuitry is, in one embodiment, an actuator for exit signs at the same site where circuit 120 is installed.

Circuit 120 is advantageous because there is very little current load placed upon the smoke detector. Moreover, the battery need supply that current for only a short period, that is, until coil 131 is energised. As with the other embodiments, the fact that coil 131; is a nominal 5 Volts DC coil; and is being briefly exposed to a substantive voltage, the delay prior to the energising of that coil is very short. Accordingly, the lifetime of the 9 Volt DC battery in the detector will not be unnecessarily compromised.

Circuit 120 also includes a normally closed manual reset button 141 for allowing a user to de-energise coil 136 and hence once again isolate terminals 7 and 8 from terminals 2 and 3. Once that occurs, and assuming the smoke condition is not still present, the alarm siren and warning lights will be deactivated.

This circuit 120, or an equivalent circuit, is able to be integrated with an alarm siren, warning lights, or other electrical device or appliance that is desired to be powered upon predetermined conditions being satisfied. In another embodiment, circuit 120 is included within the housing of a smoke detector.

Also included in circuit 120 is a normally open manual test button 142 that allows manual testing of the circuit.

Figure 11:
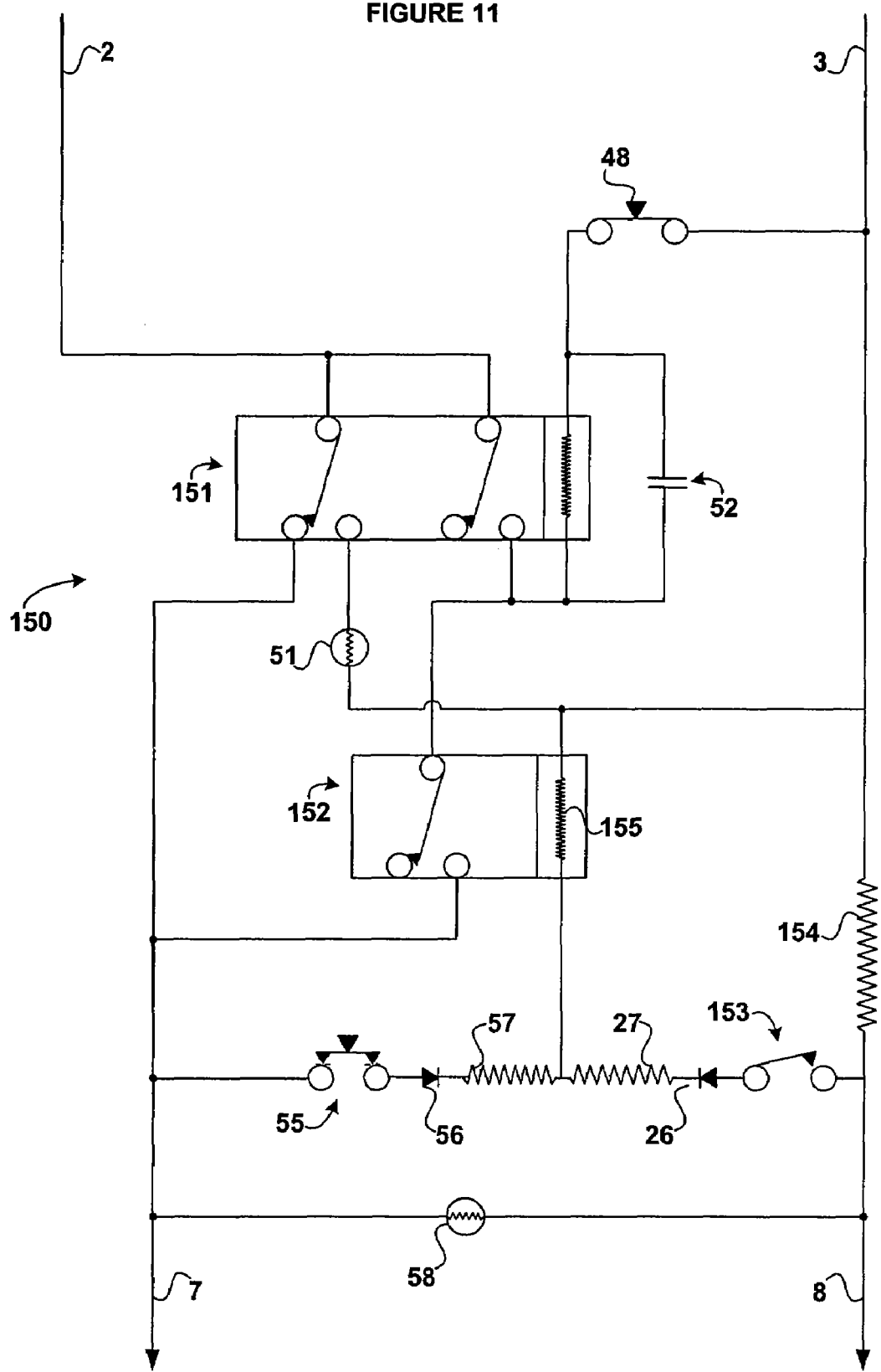
FIG. 11 is a schematic representation of a control circuit according to an embodiment of the invention for use with a 12 Volt DC load or a 24 Volt DC load.

A further embodiment of the invention, in the form of a control circuit 150, is illustrated in FIG. 11, where corresponding features are denoted by corresponding reference numerals. Circuit 150 includes input terminals 2 and 3 that for electrically connecting with a 12 Volt DC supply (not shown), and output terminals 7 and 8 for providing that supply voltage to a 12 Volt load (not shown). This circuit is primary for automotive applications, but is also suitable for domestic and commercial use. In this embodiment the load is an electric motor, and circuit 150 is for preventing that motor from starting in the event that the starting current is too great. Such a condition occurs, for example, if the motor is heavily loaded.

Circuit 150 includes a two relay combination of a 12 Volt DC relay 151 and a 5 Volt DC relay 152 that are configured similarly to relay 22 and relay 19 respectively of FIG. 3. However, due to the different operating voltages, the components are different. For instance: capacitor 52 is a 0.22 µF device that is rated at 30 Volts DC; filament lamps 51 and 58 are rated at 12 Volts DC; and resistors 27 and 57 are 22 Ω metal film resistors.

Also included within circuit 150 is a normally open manual switch 153 in series with diode 26, and a 0.5 Ω 30 Amp resistor 154 disposed between terminals 3 and 8, and in parallel with coil 155 of relay 152. Once switch 153 is depressed to commence the starting operation, should the load current of the motor—which also must flow through resistor 154—generate a sufficient voltage across coil 155, that coil will be energised and subsequently toggle relay 151 from the state shown to the alternative state. This, in turn, will disconnect the motor from the power source and allow the user to investigate and/or remove the causes that give rise to the fault condition.

Circuit 150 is applicable to other voltage supplies and loads other than motors. The application of this particular circuit to a 24 Volt DC supply requires an up-rating only of the coil in relay 115 and lumps 51 and 58. It will be appreciated that it may also be necessary to adjust the values of resistors 27 and 154 to ensure coil 155 of relay 152 is energised at the correct threshold.

Figure 12:
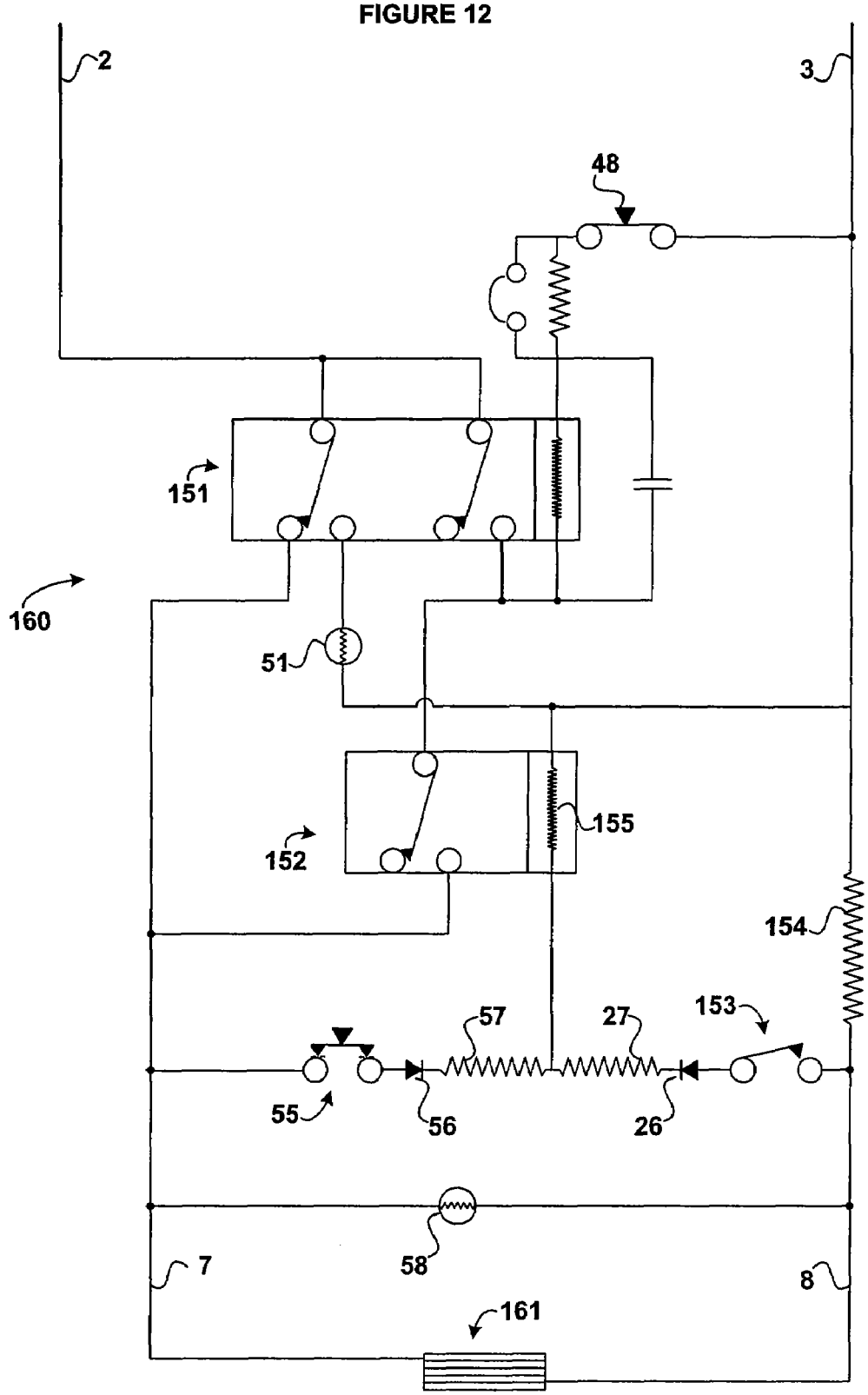
FIG. 12 is a schematic representation of a control circuit according to an embodiment of the invention for use with a 24 Volt DC load, or a 32 Volt DC load, or a 48 Volt DC load.

A still further embodiment of the invention, in the form of a control circuit 160, is illustrated in FIG. 12, where corresponding features are denoted by corresponding reference numerals. Circuit 160 is similar to circuit 150, although it includes input terminals 2 and 3 for electrically connecting with a 24 Volt AC supply (not shown), and output terminals 7 and 8 for providing that supply voltage to a 24 Volt load (not shown). In other embodiments, circuit 160 is applied to other supply voltages, including particularly 32 Volts AC and 42 Volts AC. However, many other supply voltages are also accommodated with the appropriate selection of components that are rated for those voltages. This circuit is primary for mine applications, but is also suitable for domestic and commercial use, as required. In this embodiment the load is an electric motor (not shown), and circuit 160 is for preventing that motor from operating in the event of a fault condition comprising a short between the active and neutral conductors of the power source.

In marine applications, a primary concern revolves around water, and the ability for water to interfere with electric and electronic equipment such as the motor in this embodiment. Accordingly, use is made of a contact pad 161 that is comprised of two opposed stainless steel plates that are mounted on Bakelite material or other substrate. This pad is mounted at the base of the motor. In other embodiments, however, a plurality of such pads connected in parallel and mounted to the motor at spaced apart locations. As the substrate becomes moist it progressively becomes more conductive. Eventually, as the moistness increases, pad 161 will act as a short circuit, and, duo to the voltage drop across resistor 154, relay 152 will toggle states and the motor will be isolated from terminals 2 and 3.

The control circuits of the preferred embodiments are able to be constructed cost effectively from "off-the-shelf" components that are made by leading international electric and electronic manufacturers. This makes it easy to justify the inclusion of a control circuit within a wide variety of appliances. Moreover, the assembled components are relatively compact—with typical total dimensions of about 30 mm×20 mm×10 mm—and able to be relatively easily fitted within the existing housings of a variety of typical appliances such as white goods or other domestic appliances. Alternatively, if some redesign is required, it need not be substantive.

The functionality and flexibility of the circuits of the preferred embodiments allow the invention to be applied not only directly into individual appliances, but also as a protection device for a plurality of appliances at a given site. In the event of a fault condition, this level of protection will also reduce the risk of electrocution or electric shocks. This applies even if the fault condition is caused by a three pin appliance at the site that does not itself have a dedicated control circuit according to the invention.

The embodiments used with AC mains supplies will, upon a fault condition being present, trigger within about 30 msec at a mains frequency of 60 Hz. Accordingly, the risk of electrocution or electric shock is at least as good as, and typically better, than commercially available prior art protection devices. Additionally, these embodiments monitor the voltage across the neutral conductor and a floating conductor. The floating conductor is electrically connected to those surfaces or elements that a user or other person is likely to contact and, as such, should that surface or element become electrified, the control circuit concerned will trigger. This is not over-current protection, but rather the prevention of a fault current in the first place. Prior art protection devices have typically protected against over-current conditions. However, that will still allow a large fault current to flow, at least initially, when a fault condition exists. The time that the fault condition is allowed to persist is critical when protecting against electrocution. It is in this area of minimising the quantum and duration of the other currents where the embodiments of the invention are particularly advantageous.

Some of the embodiments of the invention are configured such that the relays coils and as many of the other components as possible are at a rest condition—that is, a low power consumption condition—a during normal operating conditions. It is only once a fault condition occurs that the relays are activated and consume any substantive power. Moreover, the low voltage DC relay is only in a high power consumption mode for a very short time, for as soon as the mains relay switches, the DC relay is once again returned to a low power consumption state.

The embodiments of the invention lend themselves to being encapsulated for both electrical and physical isolation from surrounding electrical components. This allows immersion of the control circuits in water or other fluids, in use in other hazardous environment without corrupting their correct operation. This arises from the fact that the embodiments of the invention, under normal operating conditions, consume only miniscule amounts of energy and hence radiate correspondingly miniscule amounts of heat. This will ensure that the encapsulating material will not be prematurely degraded, and that no thermal build up will deteriorate the elements of the control circuit itself.

From the teaching herein it will be appreciated by those skilled in the art that it is possible to select components and combinations of components for the control circuits of the invention to allow those respective circuits to be applied to voltages and loads not expressly mentioned herein.

Although the invention has been described with reference to specific examples it will be appreciated by those skilled in the art that it may be embodied in many other forms.

The invention claimed is:

1. A control circuit including:
    at least two input terminals for electrically connecting with at least two conductors of a power source;
    at least two output terminals for electrically connecting with a load;
    a sensor having a sensor relay that is energized in response to a reference signal being within a predetermined range, the reference signal being derived from a voltage differential between one or more of the conductors and a floating reference point that is electrically isolated from the conductors when in use, wherein the sensor provides a sensor signal in response to the sensor relay being energized; and
    a switching device having a switching relay that is responsive to the sensor signal for progressing between a first mode and a second mode wherein: in the first mode the input and output terminals are respectively electrically connected for allowing the load to receive power from the source via the switching relay; and in the second mode, the input and output terminals are electrically disconnected for preventing the source from supplying power to the load via the switching relay.

2. A circuit according to claim 1 wherein the sensor relay is a low voltage DC relay.

3. A circuit according to claim 2 wherein the switching relay is a mains voltage relay.

4. A circuit according to claim 2 wherein the switching relay is a DC voltage relay.

5. A circuit according to claim 1 wherein the sensor signal is:

an AC signal; or derived from an AC signal.

6. A control circuit including:

at least two input terminals for electrically connecting with a power source;

at least two output terminals for electrically connecting with a load;

a switching relay having a switching coil that is selectively de-energised and energised to respectively progress the switching relay to a first mode and a second mode wherein: in the first mode the input and output terminals are respectively electrically connected for allowing the load to receive power from the source via the switching relay; and in the second mode, the input and output terminals are electrically disconnected for preventing the source from supplying power to the load via the switching relay; and a sensor relay having only one sensor coil, the sensor coil being progressed to an energized state in response to a fault condition for energizing the switching coil.

7. A circuit according to claim 6 wherein the sensor coil is a low voltage coil that is energised in response to the fault condition.

8. A circuit according to claim 7 wherein the low voltage coil is energised by a DC voltage.

9. A circuit according to claim 8 wherein the low voltage coil is energised by a DC voltage of greater than one Volt.

10. A circuit according to claim 6 wherein the switching relay has only one switching coil.

11. A circuit according to claims 6 wherein by progressing to the energized state, the switching relay de-energizes the sensor coil.

* * * * *